(12) United States Patent
Johnson

(10) Patent No.: US 10,195,914 B2
(45) Date of Patent: Feb. 5, 2019

(54) GUIDANCE SYSTEMS AND METHODS FOR COUPLING VEHICLES

(71) Applicant: Charles Raymond Johnson, Hauser, ID (US)

(72) Inventor: Charles Raymond Johnson, Hauser, ID (US)

( * ) Notice: Subject to any disclaimer, the term of this patent is extended or adjusted under 35 U.S.C. 154(b) by 150 days.

(21) Appl. No.: 15/458,900

(22) Filed: Mar. 14, 2017

(65) Prior Publication Data
US 2017/0261302 A1    Sep. 14, 2017

Related U.S. Application Data

(60) Provisional application No. 62/307,667, filed on Mar. 14, 2016.

(51) Int. Cl.
*B60D 1/36* (2006.01)
*B60D 1/58* (2006.01)

(52) U.S. Cl.
CPC .......... *B60D 1/58* (2013.01); *B60D 1/36* (2013.01)

(58) Field of Classification Search
CPC ....................................................... B60D 1/36
USPC .................................. 33/264, 286, 288, 600
See application file for complete search history.

(56) References Cited

U.S. PATENT DOCUMENTS

| | | | | |
|---|---|---|---|---|
| 4,192,526 A * | 3/1980 | Myers | ...................... | B60D 1/36 280/477 |
| 4,405,144 A | 9/1983 | Chambers | | |
| 4,856,200 A * | 8/1989 | Riggs | ...................... | B60D 1/36 33/264 |
| 5,235,468 A | 8/1993 | Stephens | | |
| 5,669,621 A * | 9/1997 | Lockwood | ............... | B60D 1/36 280/477 |
| 5,680,706 A | 10/1997 | Talcott | | |
| 6,168,181 B1 * | 1/2001 | Gadd | ...................... | B60D 1/36 116/28 R |
| 6,318,747 B1 * | 11/2001 | Ratican | ................... | B60D 1/36 116/28 R |
| 6,612,603 B2 * | 9/2003 | Alger | ...................... | B60D 1/36 280/477 |
| 6,764,091 B1 | 7/2004 | Grasso et al. | | |
| 6,827,363 B1 | 12/2004 | Amerson | | |
| 6,863,294 B1 | 3/2005 | Bonham | | |
| 7,681,903 B1 | 3/2010 | Bonacci | | |
| 7,891,691 B2 | 2/2011 | Bearey | | |
| 2002/0148124 A1 * | 10/2002 | Strange | ................... | B60D 1/36 33/264 |
| 2005/0200099 A1 | 9/2005 | Moberly et al. | | |
| 2006/0108771 A1 | 5/2006 | Elkins et al. | | |
| 2006/0220345 A1 | 10/2006 | Schmidt | | |
| 2006/0244578 A1 | 11/2006 | Martin | | |

(Continued)

OTHER PUBLICATIONS

Product Information for Similar Product, "Hitching Made Easy", http://www.trailerlife.com/trailer-how-to/trailer-tech/hitching-made-easy/.

(Continued)

*Primary Examiner* — G. Bradley Bennett
(74) *Attorney, Agent, or Firm* — Wells St. John P.S.

(57) ABSTRACT

This disclosure includes a guidance system for coupling vehicles. The system has a hub and a first length of material secured to the hub and configured for spacing the hub from a coupling device of a first vehicle. A second length of material is secured to the hub and configured for spacing the hub from a wheel of a second vehicle for coupling with the first vehicle.

17 Claims, 19 Drawing Sheets

(56) References Cited

U.S. PATENT DOCUMENTS

| | | | | |
|---|---|---|---|---|
| 2007/0137053 A1* | 6/2007 | Ball | ................ | B60D 1/36 |
| | | | | 33/286 |
| 2007/0159310 A1* | 7/2007 | Ball | ................ | B60D 1/36 |
| | | | | 340/431 |
| 2009/0194969 A1* | 8/2009 | Bearey | ................ | B60D 1/36 |
| | | | | 280/477 |
| 2011/0216199 A1* | 9/2011 | Trevino | ................ | B60D 1/36 |
| | | | | 348/148 |
| 2016/0252338 A1* | 9/2016 | Lanigan, Sr. | ................ | B61D 47/00 |
| | | | | 33/203.13 |

OTHER PUBLICATIONS

Safe and Product Information for Similar Product, "DuraSafe CC001 Coupler Connect Trailer Hitch Alignment Device",—https://www.amazon.com/DuraSafe-Coupler-Connect-Trailer-Alignment/dp/B004VWETFU.

Sale and Product Information for Similar Product, "Trailer Alignment Kit Magnet Hitch Line Up", https://www.amazon.com/Trailer-Alignment-Magnet-Hitch-Camper/dp/B001F4MQYI.

* cited by examiner

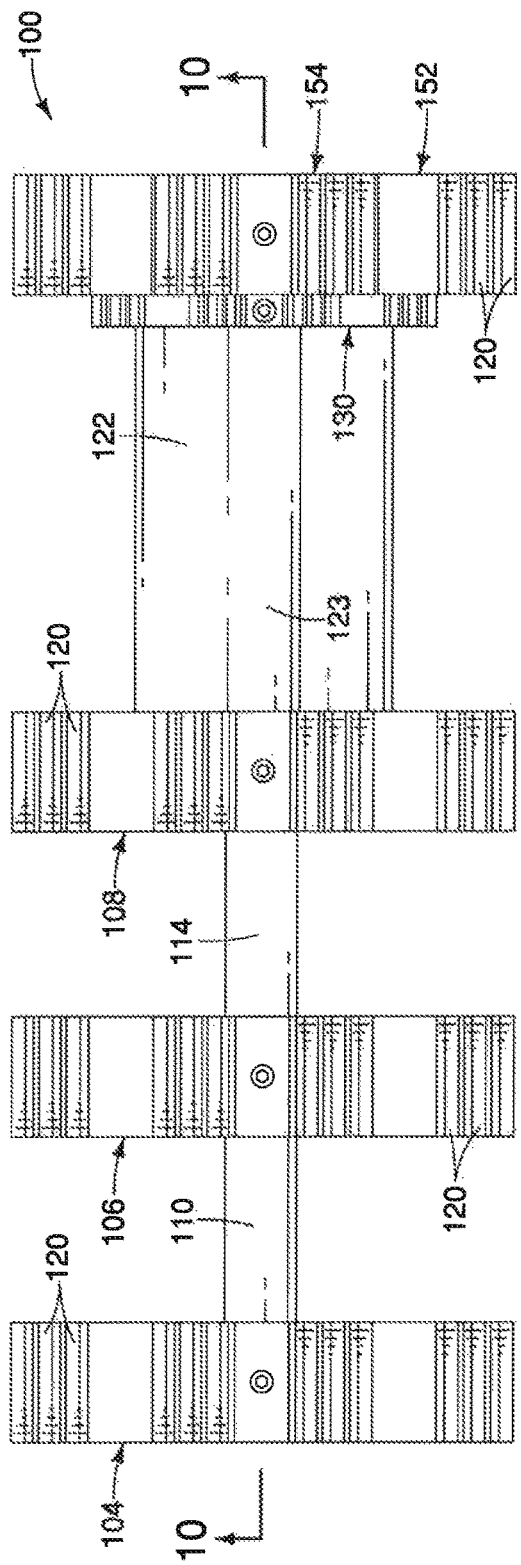
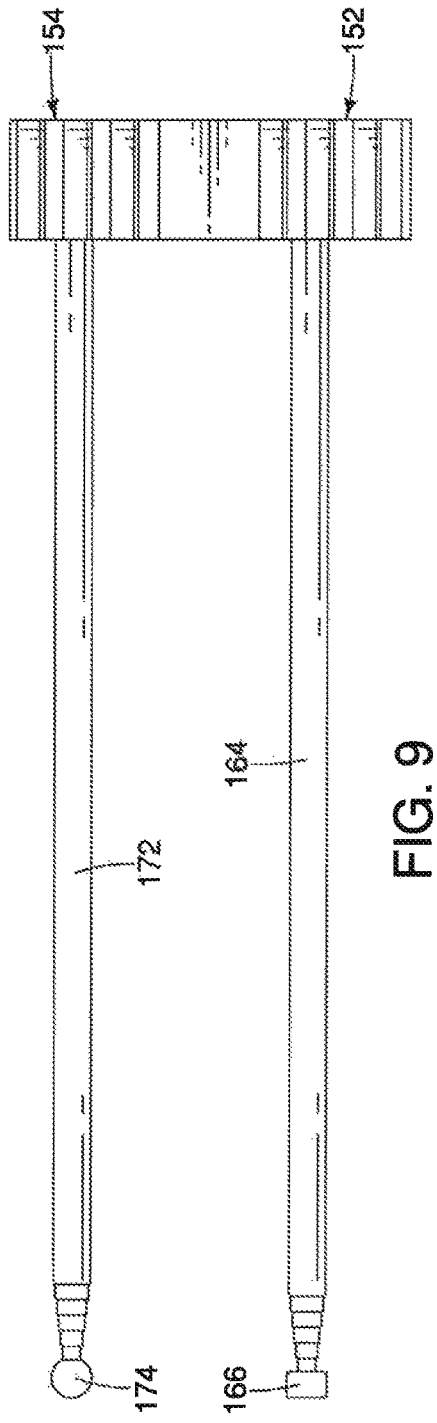
FIG. 8
FIG. 9

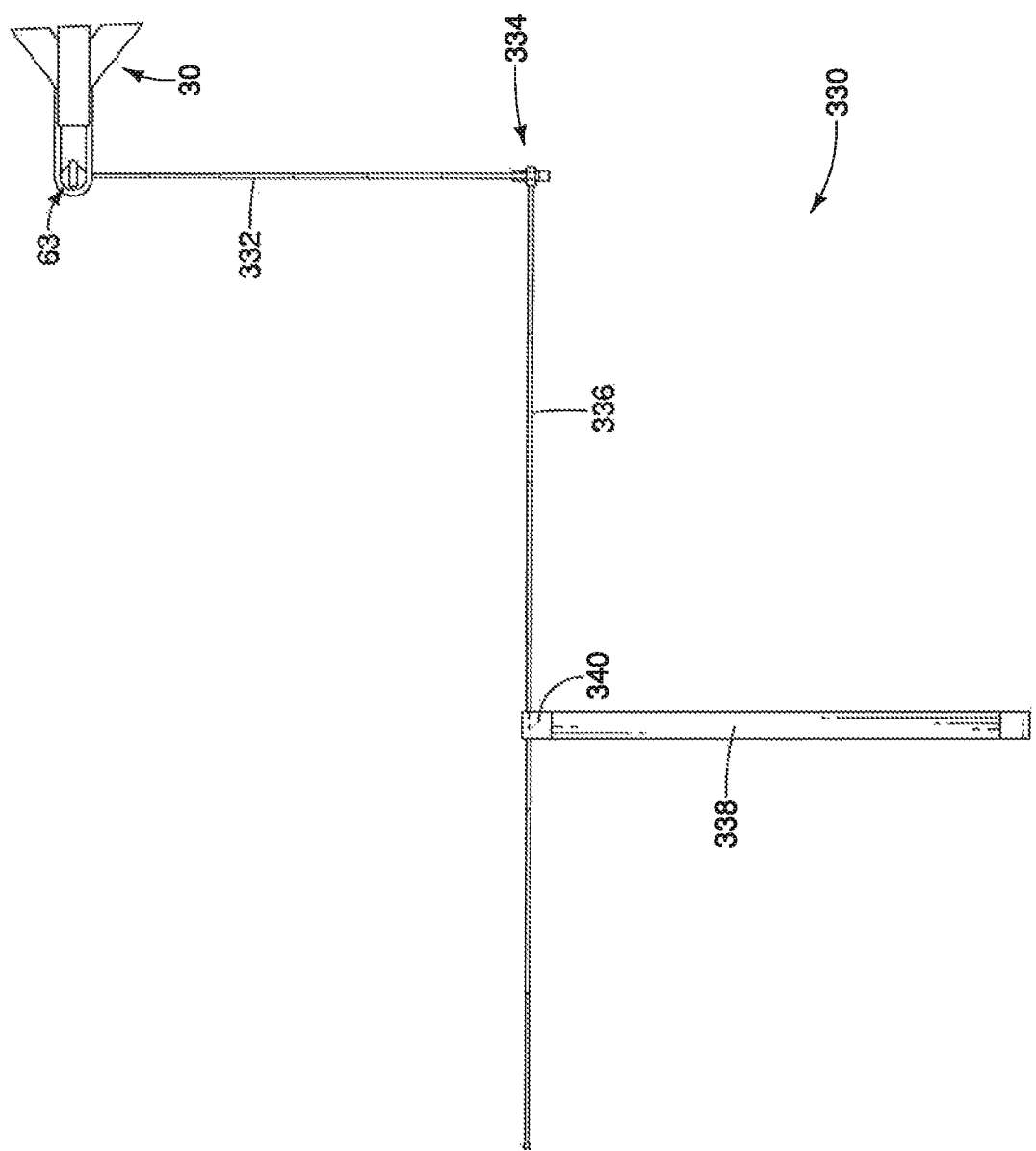

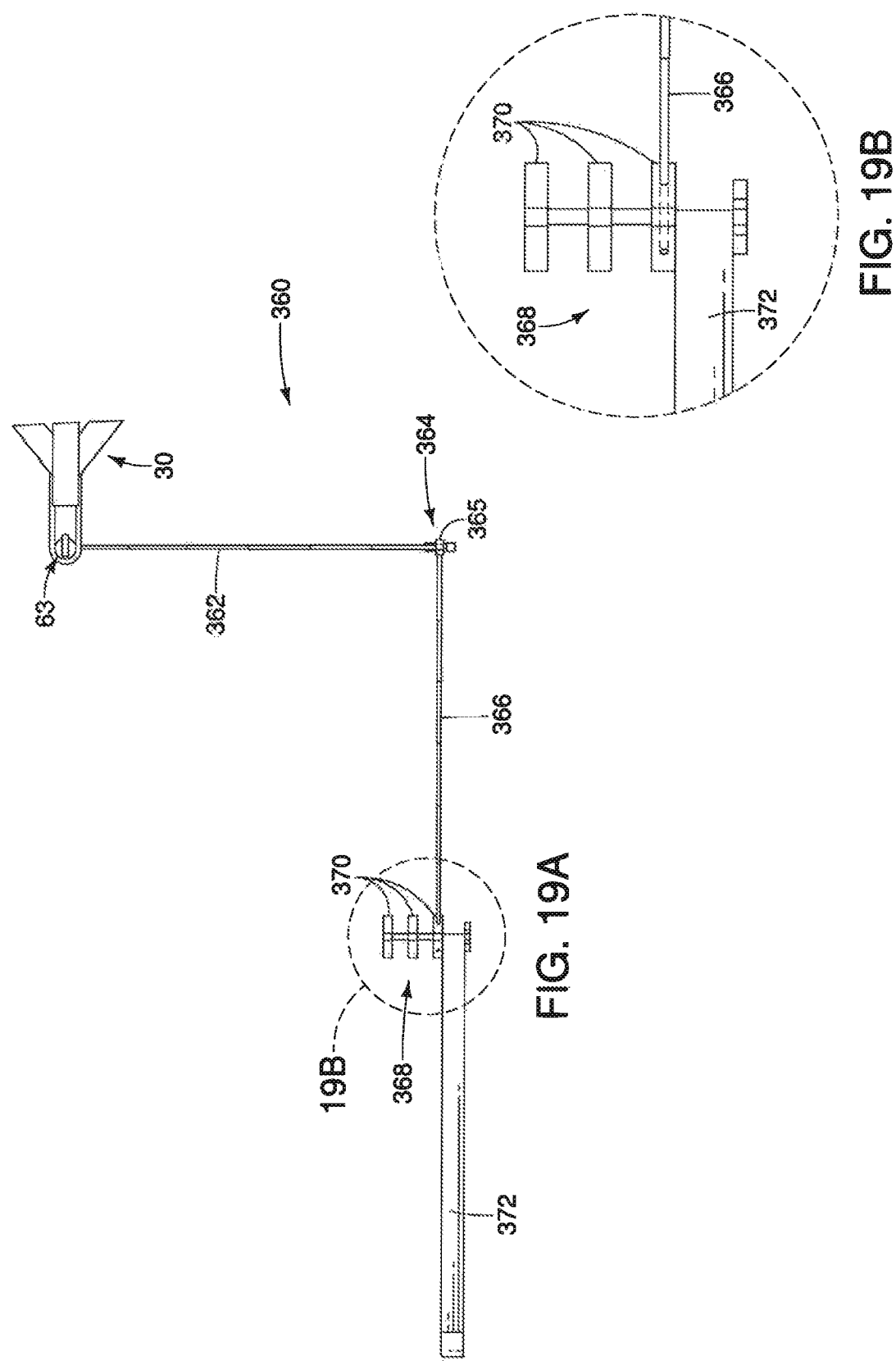

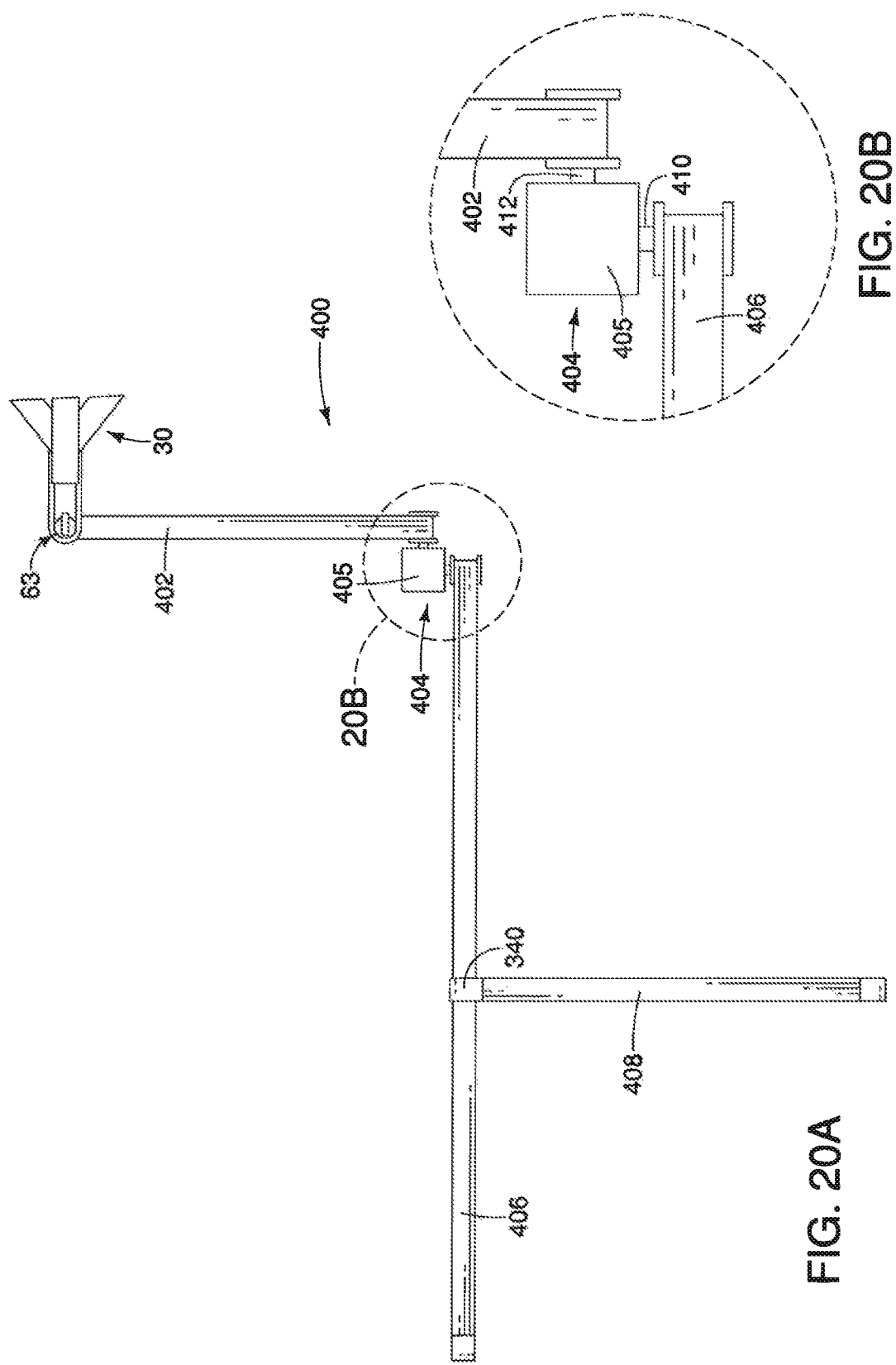

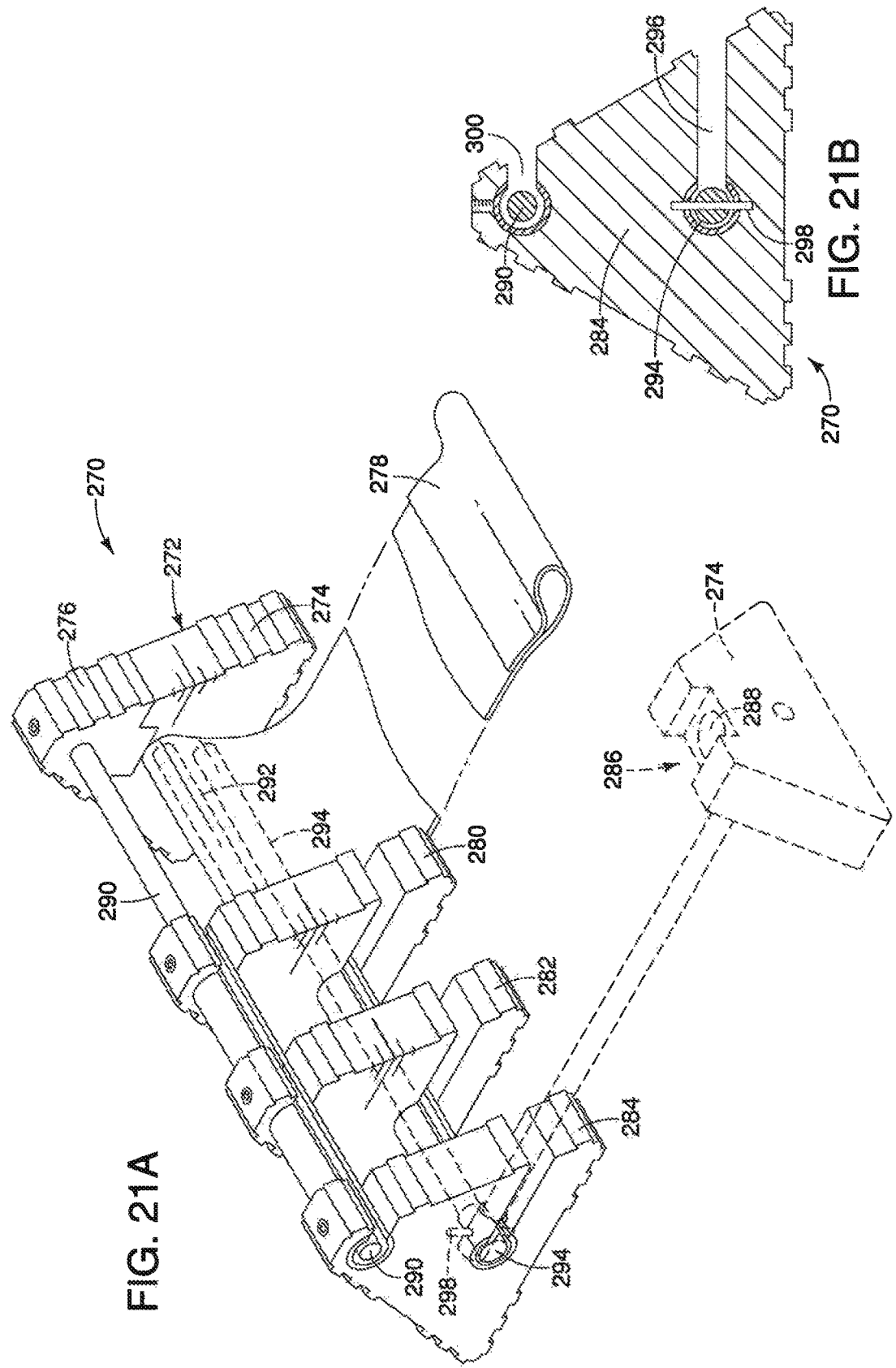

GUIDANCE SYSTEMS AND METHODS FOR COUPLING VEHICLES

CROSS REFERENCE TO RELATED APPLICATION

This application claims priority from U.S. Provisional Patent Application 62/307,667 filed Mar. 14, 2016, the disclosure of which is incorporated herein by reference.

TECHNICAL FIELD

The subject matter of this application relates to guidance systems and methods for coupling vehicles.

BACKGROUND OF THE DISCLOSURE

An unpowered vehicle, such as a trailer, is moved by being secured or coupled to a towing vehicle that is powered for movement, such as a motor vehicle. As one of many examples, an exemplary hitch mechanism or coupling system is a tow ball (ball hitch, trailer ball, etc.) configured to be received in a socket (trailer socket, trailer coupler, etc.). The tow ball is secured on a motor vehicle such as a truck or car and the socket is secured at the front of the trailer. Securing the tow ball into the socket provides a vehicle-to-vehicle connection that allows for movement of the trailer by the towing vehicle (truck).

However, coupling the towing vehicle to the trailer requires aligning the hitch mechanism, that is, aligning the tow ball beneath the socket. This coupling maneuver is difficult simply because the tow ball and socket cannot be viewed directly, if at all. Consequently, there is a need for guidance systems and methods that provide the capability of guiding and stopping a powered vehicle relative to an unpowered vehicle wherein the respective coupling devices (for example, tow ball and socket) are aligned for coupling.

While the subject matter of this application was motivated in addressing coupling vehicles, it is in no way so limited. The disclosure is only limited by the accompanying claims as literally worded, without interpretative or other limiting reference to the specification, and in accordance with the doctrine of equivalents.

Other aspects and implementations are contemplated.

BRIEF DESCRIPTION OF THE DRAWINGS

Exemplary embodiments of the various disclosures are described below with reference to the following accompanying drawings. The drawings may be considered to represent scale.

FIG. 8 is a top view of the guidance system of FIG. 5.

FIG. 9 is a side view of the spatial device of the guidance system of FIG. 2.

FIG. 18 is a perspective view of another exemplary guidance system according to another embodiment of the invention and illustrated in a method of use.

FIG. 19A is a perspective view of another exemplary guidance system according to another embodiment of the invention and illustrated in a method of use.

FIG. 19B is a close-up perspective view of an exemplary cooperation of structures in the guidance system of FIG. 19A.

FIG. 20A is a perspective view of another exemplary guidance system according to another embodiment of the invention and illustrated in a method of use.

FIG. 20B is a close-up perspective view of an exemplary cooperation of structures in the guidance system of FIG. 20A.

FIG. 21A is a perspective view of another exemplary guidance system according to another embodiment of the invention.

FIG. 21B is a sectional view of an another exemplary foot structure of the guidance system of FIG. 21A.

DETAILED DESCRIPTION OF THE EMBODIMENTS

This disclosure is submitted in furtherance of the constitutional purposes of the U.S. Patent Laws "to promote the progress of science and useful arts" (Article 1, Section 8).

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

Figure 1:
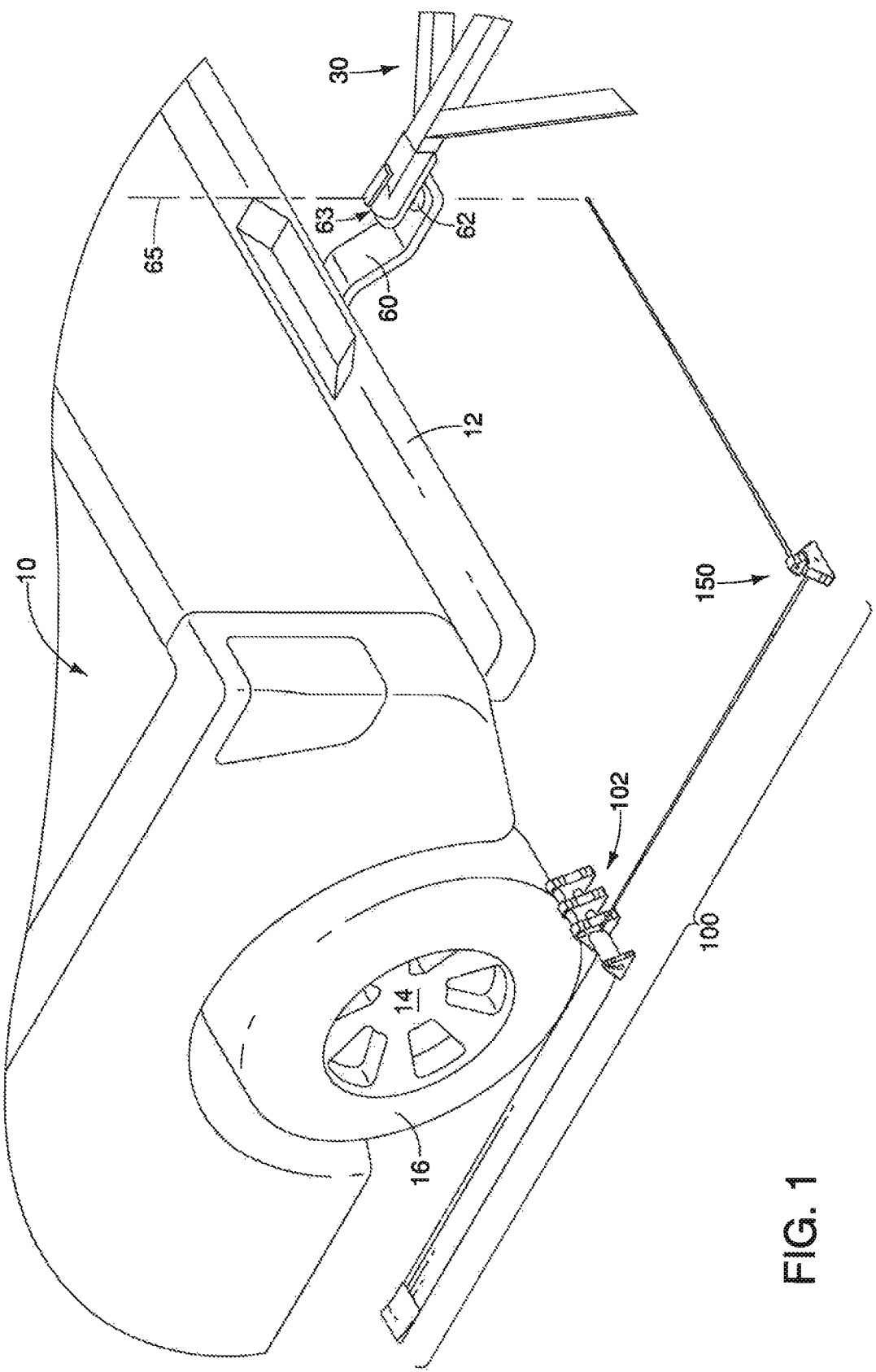
FIG. 1 is a partial perspective view of an exemplary guidance system in an exemplary method of use according to an embodiment of the invention.

Referring to FIG. 1, an exemplary method of use for one exemplary guidance system 100 is shown according to an embodiment of the invention. A portion of a powered vehicle 10 and a portion of an unpowered vehicle 30 are shown. For ease of discussion and without any limiting effect, the exemplary powered vehicle 10 is a motor vehicle such as a truck and the exemplary unpowered vehicle 30 is a trailer. Truck 10 includes a wheel 14 with a tire 16.

It should be understood that the truck 10 includes a first portion of a hitch mechanism (or coupling system) collectively represented as 60/62 and the trailer 30 includes a second portion of the hitch mechanism represented as 63. The first portion 60/62 of the hitch mechanism secured to the truck 10 includes a tow bar 60 extending from beneath bumper 12 and a tow ball 62 extending vertically from an end of the tow bar 60. The second portion of the hitch mechanism secured to the trailer 30 is a trailer socket 63 configured to receive the tow ball 62. The tow ball 62 is obscured from view by the trailer socket 63 in FIG. 1.

Still referring to FIG. 1, an exemplary embodiment of the invention is a guidance system 100 for coupling the truck 10 to the trailer 30 via the hitch mechanism 60/62/63. In one exemplary embodiment, the guidance system 100 has two discrete structures: a stop device 102 and a spatial device 150. The spatial device 150 establishes the positioning of the stop device 102 to ultimately stop the truck 10 relative to the trailer 30 with the tow ball 62 aligned directly below the trailer socket 63 along an imaginary alignment axis 65.

Figure 2:
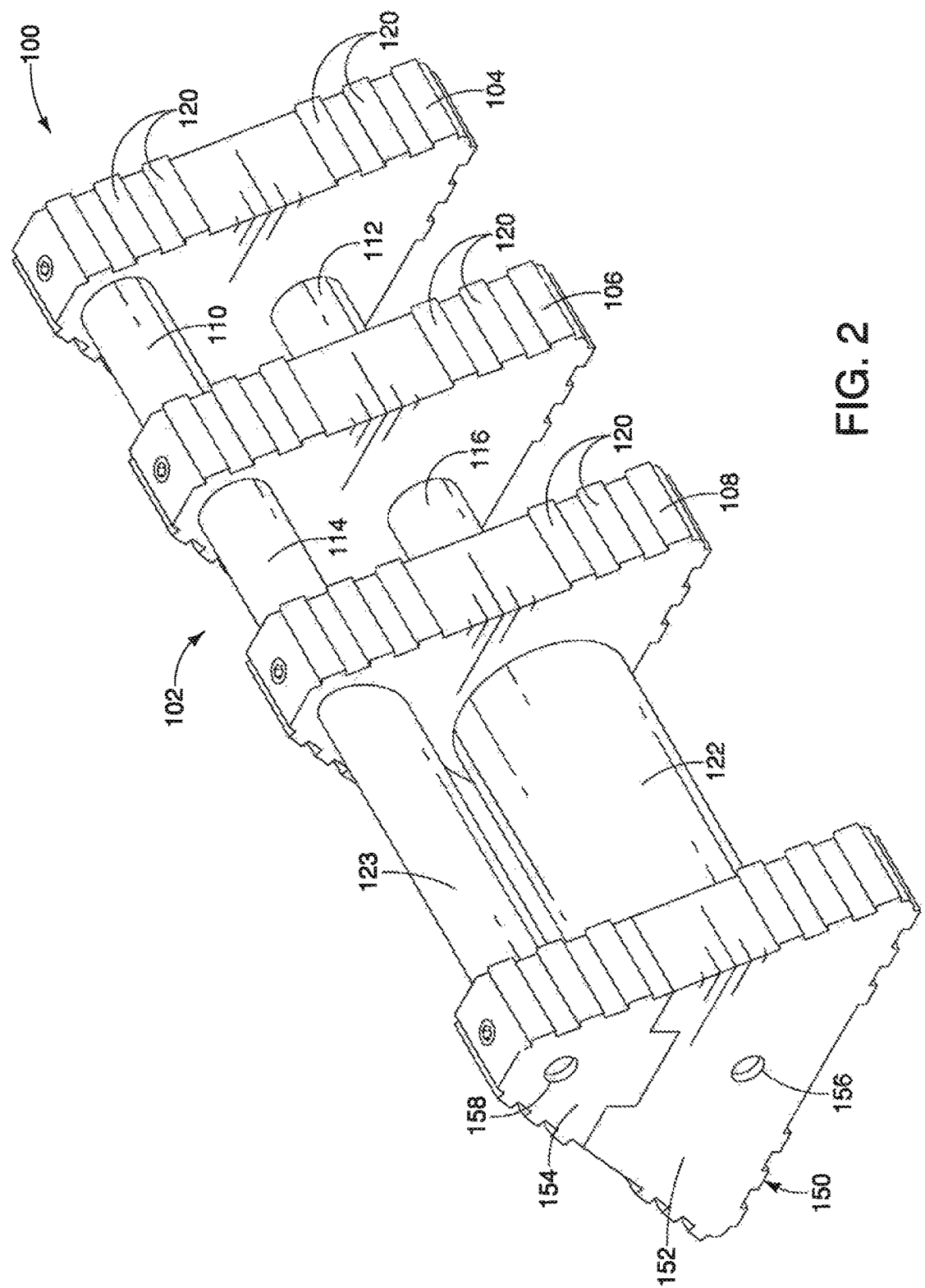
FIG. 2 is a perspective view of an exemplary guidance system according to an embodiment of the invention.
Figure 3:
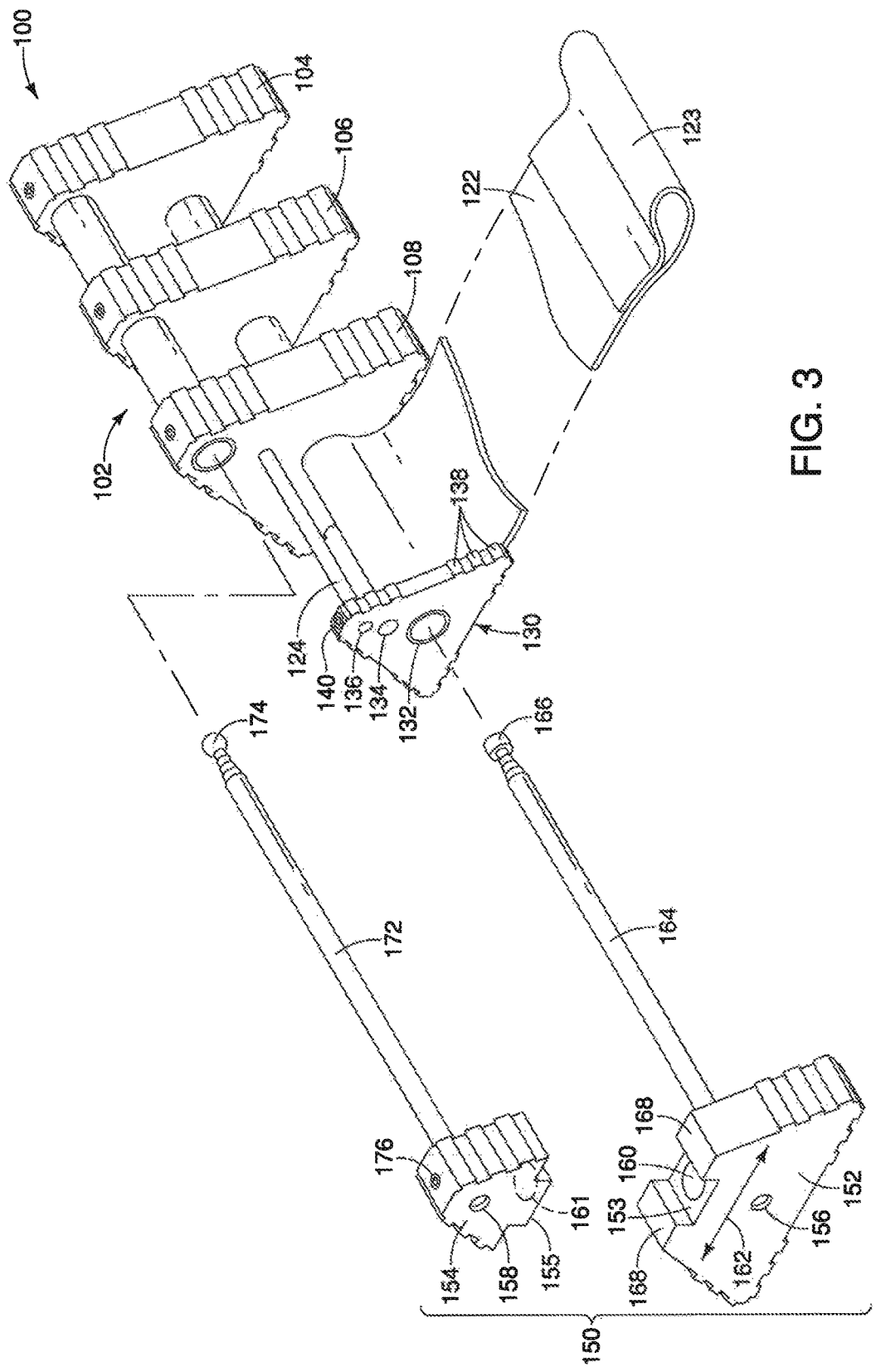
FIG. 3 is the guidance system of FIG. 2 illustrating structures that can be separated.

Referring to FIGS. 2-10, the guidance system 100 is illustrated wherein FIG. 2 shows the guidance system 100 in a storage (or closed) configuration or condition with the spatial device 150 interlocked and secured in the stop device 102 for compactness. FIG. 3 illustrates the spatial device 150 separated from the stop device 102. The stop device 102 has three spaced foot structures 104, 106, 108 and the spatial device 150 has one foot structure (or hub) 152/154. The foot structures are shaped as triangles with ridges 120 (see FIGS. 2, 5, 6) on the outer periphery. Other shapes are contemplated such as squares, rectangles, hexagons, etc.

The stop device 102 has an end plate 130 at one end and foot structure 104 at the opposite end (see FIG. 3). End plate 130 is shaped as a triangle with smaller dimensions than foot structures 104, 106, 108 and includes ridges 138 on outer periphery. A lower tube structure extends between foot structures 104, 106, 108, and end plate 130 and is referenced as: 112 between foot structures 104 and 106; 116 between foot structures 106 and 108; and 132 (see FIGS. 5 and 10B) between foot structure 108 and end plate 130. This lower tube structure can be a single tube structure or any combination of separate and discrete structures. One or more of foot structures 104, 106, 108 and end plate 130 can be affixed or secured immovable on this lower tube structure in spaced relation. Alternatively, one or more of foot structures can be slidingly engaged on the lower tube structure to move axially along the lower tube structure.

The stop device 102 also has an upper tube structure extending between foot structures 104, 106 and 108, and is referenced as: 110 between foot structures 104 and 106; 114 between foot structures 106 and 108. (see FIGS. 5 and 10B). This upper tube structure can be a single tube structure or any combination of separate and discrete structures. One or more of foot structures 104, 106 and 108 can be affixed or secured immovable on this upper tube structure in spaced relation. Alternatively, one or more of foot structures 104, 106 and 108 can be slidingly engaged on the upper tube structure to move axially along the upper tube structure.

The stop device 102 includes a rod 124 (see FIG. 3) extending between end plate 130 and foot structure 108 above lower tube structure 132. Rod 124 has an end 136 exposed from outer face of end plate 132. Between end 136 and lower tube structure 132, and exposed from outer face of end plate 132 is a magnet 134. Stop device 102 further includes a flexible strap (length of material or strip or strip of material, etc.) 122 with one end secured around lower tube structure 132 (between end plate 130 and foot structure 108) and an opposite end forming a loop 123. In the storage condition, flexible strap 122 will be wrapped repeatedly around lower tube structure 132 and rod 124 (see FIGS. 10A and 10B) until loop 123 is positioned above rod 124. Ultimately, rod 172 of spatial device 150 extends through loop 123 of flexible strap 122 in the closed or storage position of the guidance system 100.

In the separated condition for guidance system 100, the spatial device 150 is removed from the stop device 102 (see FIGS. 3 and 9) and has two rods 164 and 172 (for example, telescoping rods) extending from the same face of foot structure 152/154. It should be understood that foot structure 152/154 of spatial device 150 is comprised by two separate and discrete portions, a lower section 152 and an upper section 154 that can be separated from each other (see FIG. 3). At the top of lower section 152 is a groove 153 configured to receive extension 155 formed at the bottom of upper section 154 when the two sections 152 and 154 are mated together.

A magnet 160 is exposed in groove 153 and a magnet 161 is exposed from extension 155 and both magnets attract each other (see FIG. 10A) when the two sections 152 and 154 are mated. Rod 164 extends from lower section 152 and rod 172 extends from upper section 154. In one exemplary embodiment, rods 164 and 172 are telescoping rods. In another exemplary embodiment, rod 164 has an end configured as a symbolic tire or wheel 166 (see FIG. 3) as a reminder that the end of rod 164 is ultimately to be placed next to a tire of a motor vehicle during use of guidance system 100. In still another exemplary embodiment, rod 172 has an end configured as a symbolic tow ball 174 (see FIG. 3) as a reminder that the end of rod 172 is ultimately to be placed beneath a coupling device of a trailer.

Figure 7:
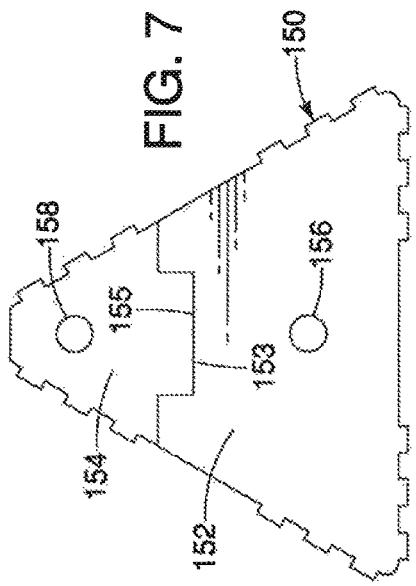
FIG. 7 is a right-side view of the guidance system of FIG. 5.
Figure 6:
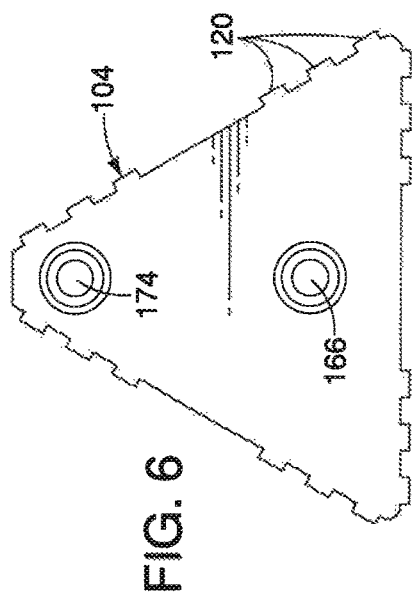
FIG. 6 is a left-side view of the guidance system of FIG. 5.

In the storage condition for guidance system 100, FIG. 6 illustrates symbolic tire 166 of rod 164 being exposed through a first opening of the outer face of foot structure 104 and symbolic tow ball 174 is exposed through a second opening of the outer face of foot structure 104. FIG. 7 illustrates openings 156 and 158 of the outer face of lower section 152 and upper section 154, respectively, of the spatial device 150.

Figure 5:
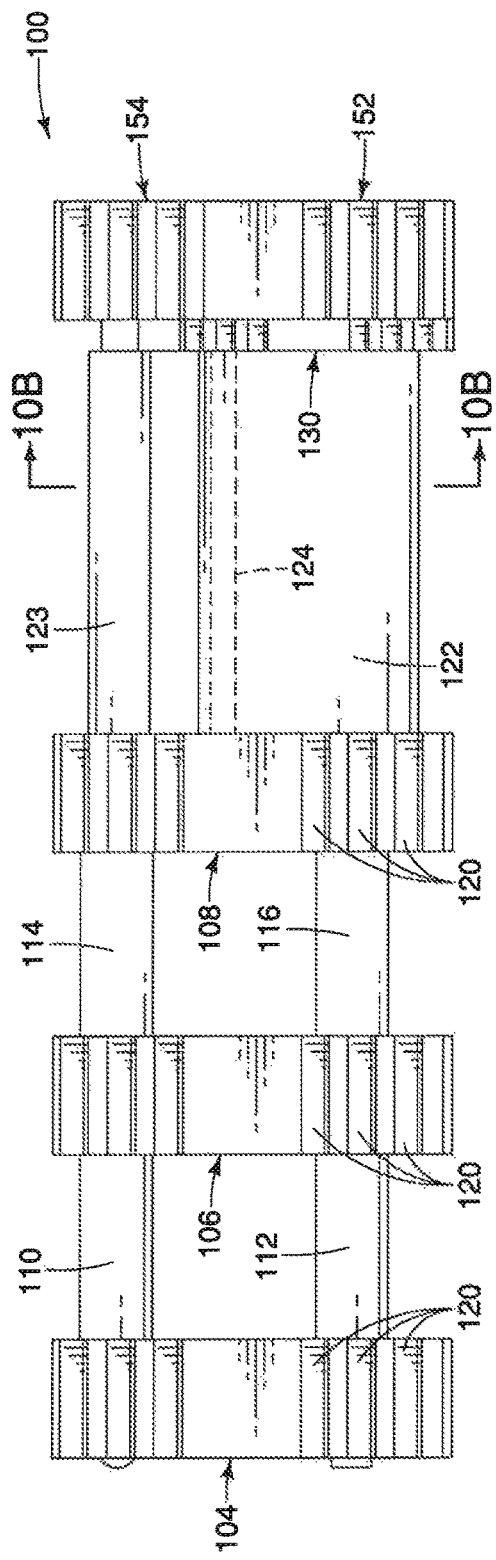
FIG. 5 is a front view of the guidance system of FIG. 2.
Figure 10A:
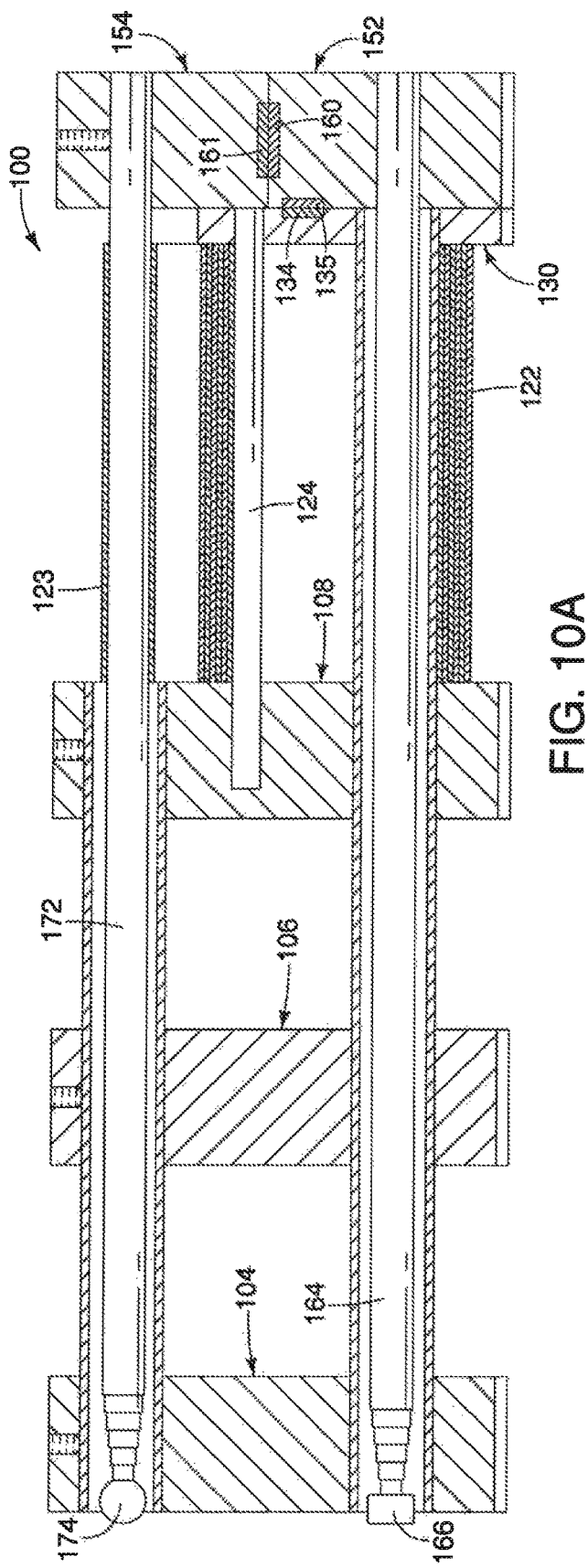
FIG. 10A is a sectional view of the guidance system of FIG. 2 taken along sectional line 10-10 of FIG. 8.
Figure 10B:
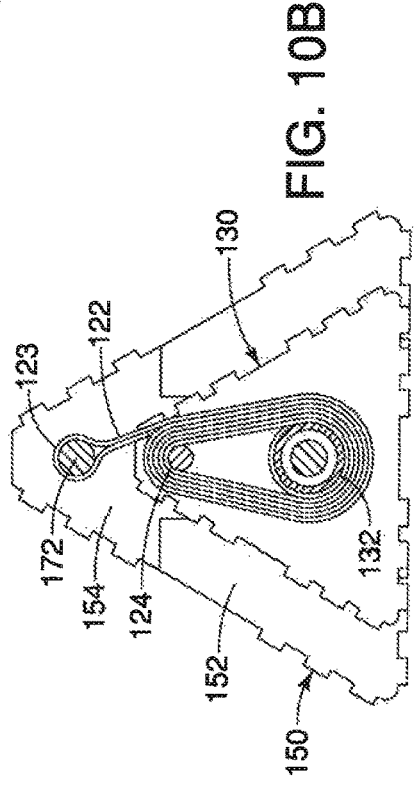
FIG. 10B is a sectional view of the guidance system of FIG. 2 taken along sectional line 10B-10B of FIG. 5.
Figure 11:
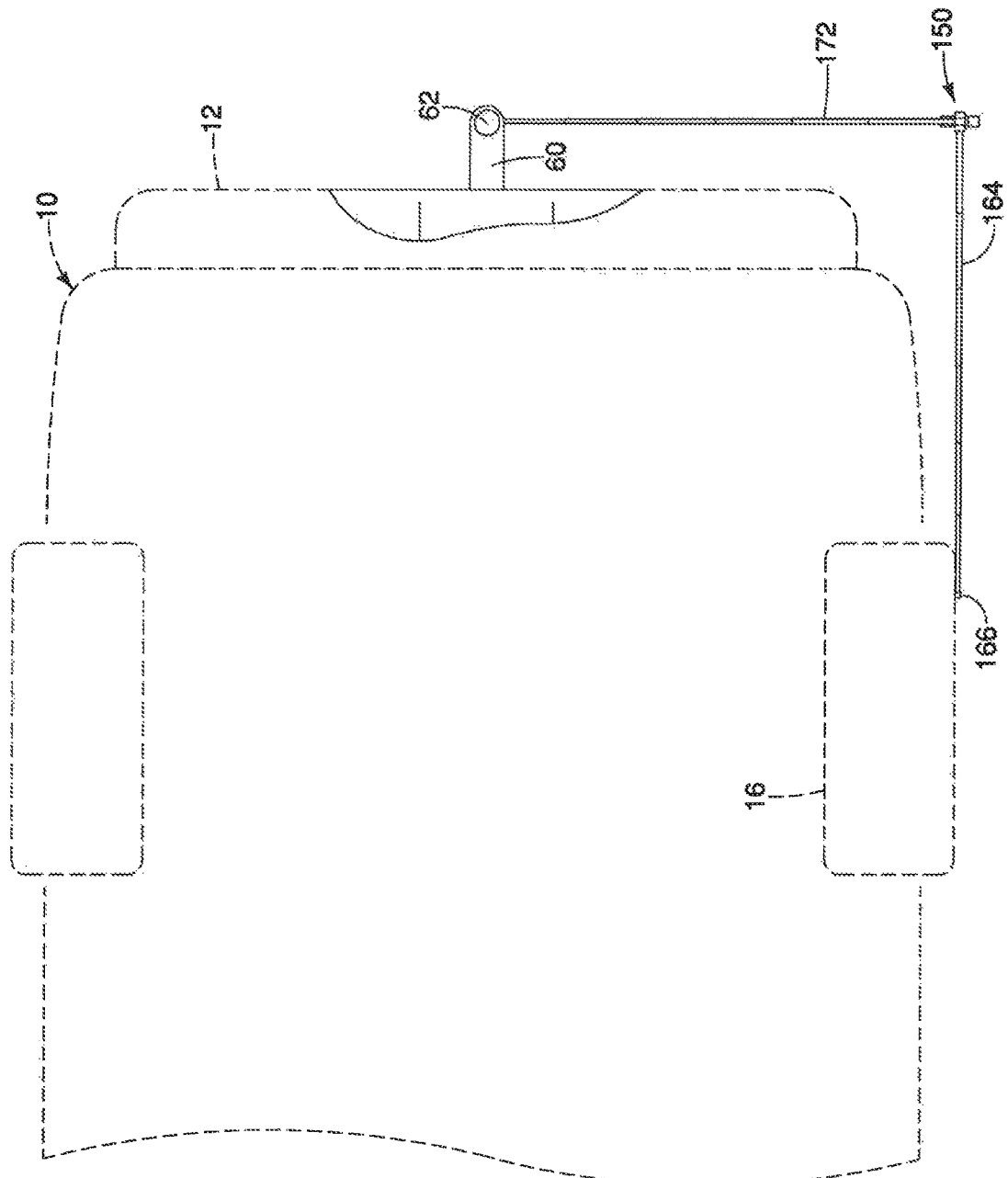
FIG. 11 is a view of an exemplary method step of use for the guidance system of FIG. 2.

Further regarding magnets, and in the storage condition for guidance system 100, magnet 134 of end plate 130 (of stop device 102) is mated with magnet 135 (see FIG. 10A) which is exposed from inside face of lower section 152 of spatial device 150. Further in this storage condition as shown in FIGS. 5, 10A and 10B, rod 172 of spatial device 150 extends over end plate 130 and through loop 123 of flexible strap 122 over rod 124 and through upper tube structure 110 and 114 between foot structures 108, 106 and 104. Further in this storage condition, rod 164 of spatial device 150 extends through lower tube structure 112 and 116 between foot structures 108, 106 and 104, and through lower tube structure 132 between foot structure 108 and end plate 130. In the storage condition, the rods 164 and 172 extend generally in the same direction and generally parallel wherein the respective faces of upper and lower sections 154 and 152 are oriented in a coplanar fashion.

Figure 4:
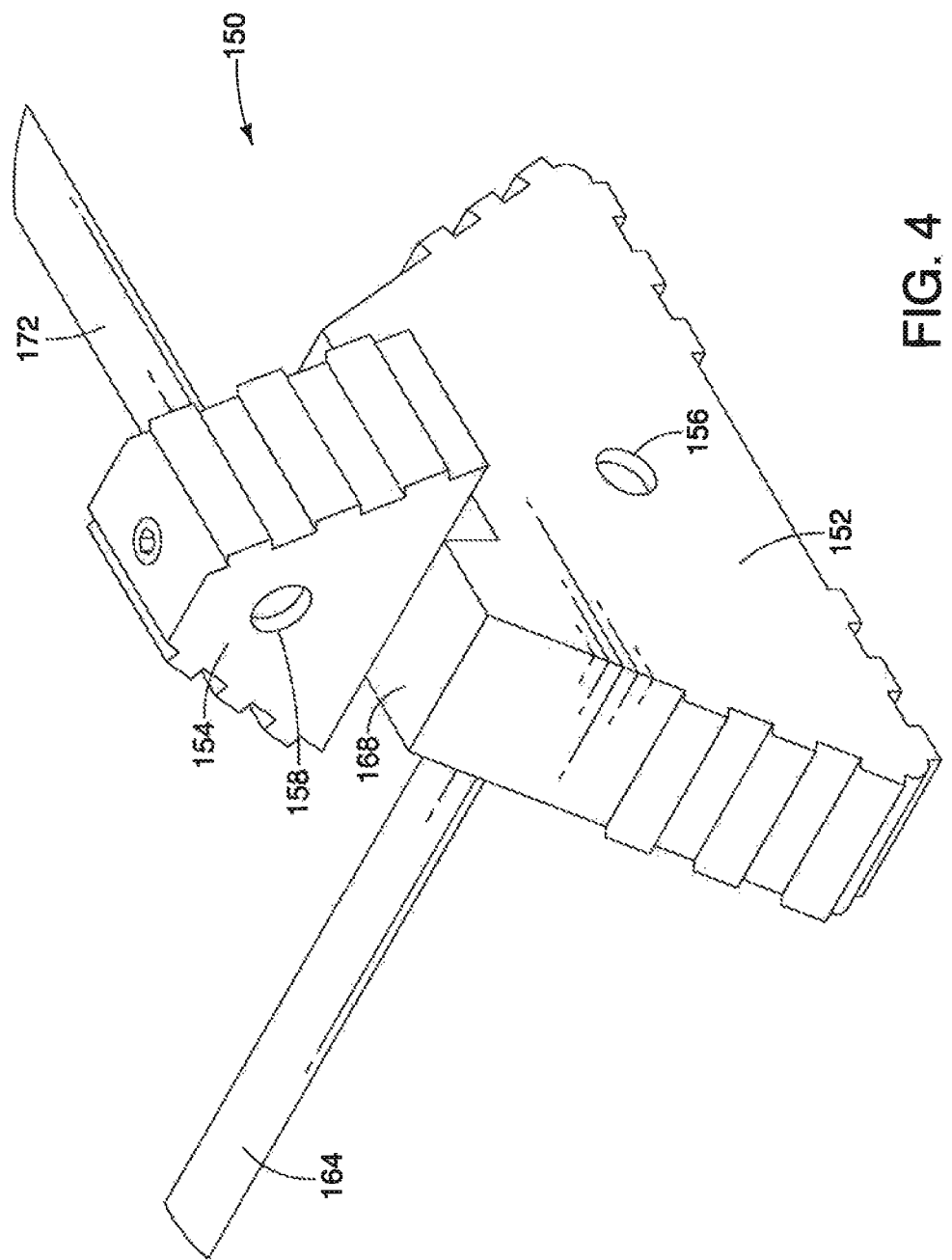
FIG. 4 is a perspective view of an exemplary spatial device of the guidance system of FIG. 2 illustrating functionality.

Referring to FIG. 4, a method of using the spatial device 150 is further described. The spatial device 150 is separated and removed from the stop device 102 by overcoming the force applied by magnets 134 and 135 (see FIG. 10A). The upper and lower sections 154 and 152 of spatial device 150 are separated by overcoming the force applied by magnets 160 and 161 (see FIG. 10A). One, or both, of the upper and lower sections 154 and 152 are rotated for a total of approximately 90 degrees wherein the rods 164 and 172 extend generally in a 90-degree orientation relative to each other. The extension 155 of upper section 154 is placed in the groove 153 of lower section 152 allowing magnets 160 and 161 to mate the lower and upper sections 152 and 154 together again but with the rods 164 and 172 oriented 90 degrees relative to each other. The purpose of this capability is described subsequently.

Referring to FIGS. 11 to 15, an exemplary method of use 500 for exemplary guidance system 100 is shown according to an embodiment of the invention. Assuming the guidance system 100 is in the storage condition, a first method step 502 is that the spatial device 150 is removed from the stop device 102 as described previously and positioned proximate a rear corner of the bumper 12 of truck 10. For a second method step 504, the lower and upper sections 152 and 154 are mated together as described with respect to FIG. 4 in a 90-degree orientation. As a third method step 506, rod 172 is extended until the symbolic tow ball 174 is aligned directly below the tow ball 62 of the truck and rod 164 is extended until the symbolic tire 166 is oriented just outside an outer periphery of the tire 16 of truck 10 generally at the point where the tire 16 contacts the substrate such as the ground (gravel, driveway or concrete, etc.).

This third method step 506 is a measurement step which is specific for the specific vehicle being used, and therefore, the extension lengths of rods 164 and 172 is noted (or marked) so that this third method step 506 will not have to be repeated for this specific vehicle. An exemplary marking of the extension lengths includes marking an intersection of two intersecting telescopic sections of each rod while each rod is in the extended position. Accordingly, when the rod is extended again and the markings of the intersection of the two previously selected telescopic sections is exposed, the rod will be at the same extension length as was previously measured and needed for this specific vehicle/truck 10.

Figure 12:
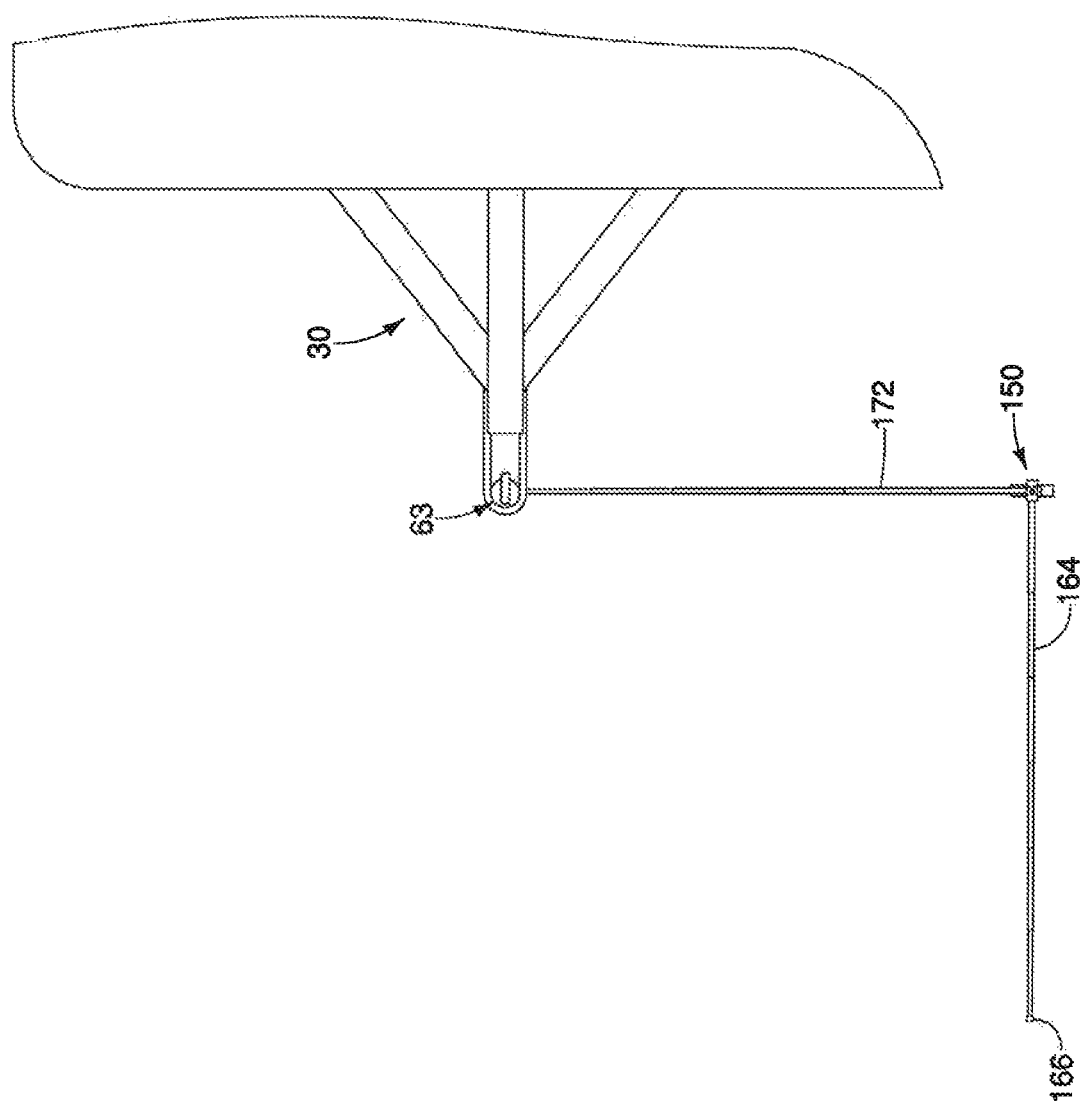
FIG. 12 is a view of another exemplary method step of use for the guidance system of FIG. 2.

Referring to FIG. 12 (and assuming the spatial device 150 is already removed from the stop device 102), a fourth method step 508 includes extending rod 172 until the markings are shown and positioning the symbolic tow ball 62 of rod 172 under trailer socket 63. Another aspect of the fourth method step 508 includes extending rod 164 until the markings are shown and positioning rod 164 directed generally along an anticipated direction of the rearward direction of vehicle 10 as it moves in reverse toward trailer 30.

Figure 13:
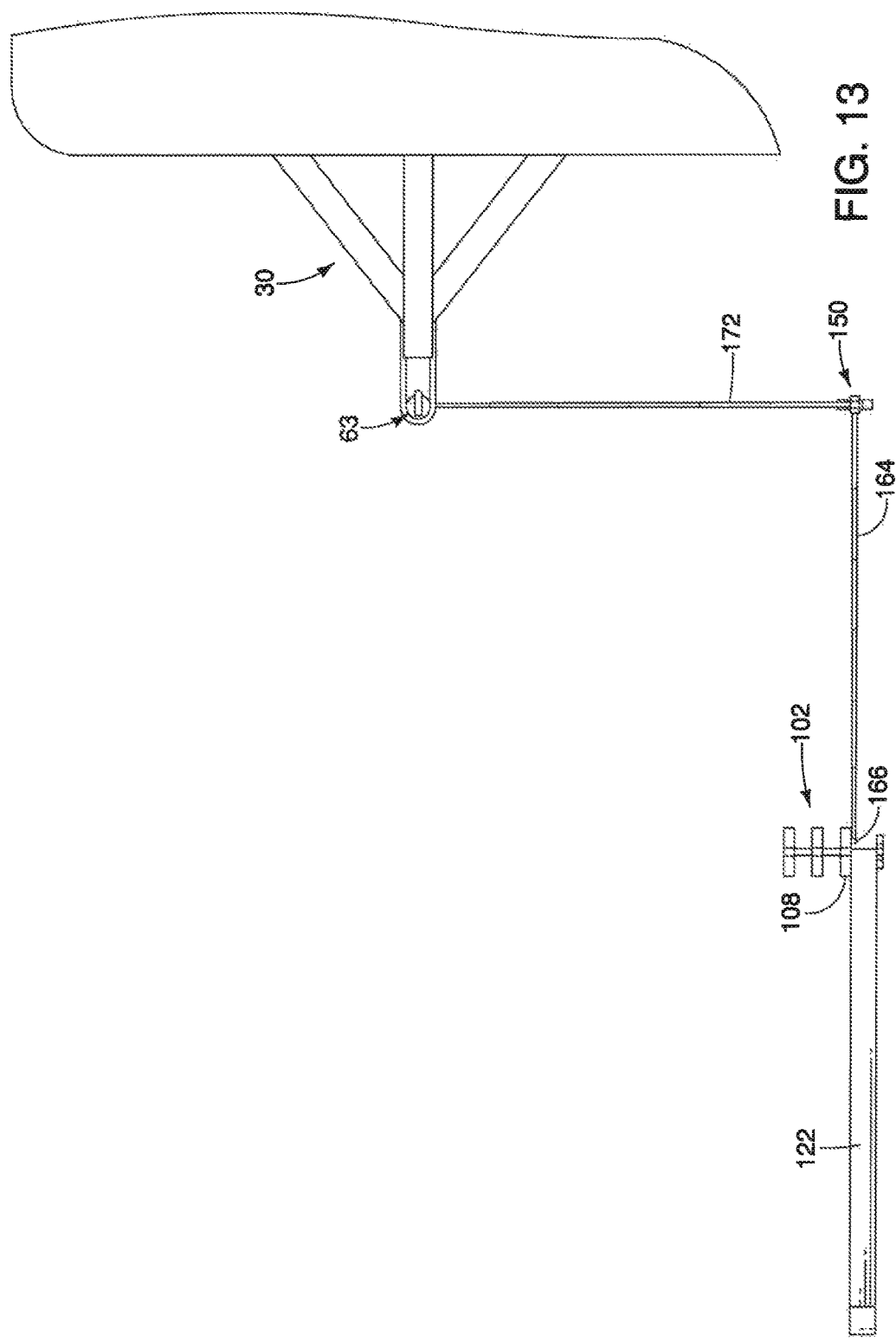
FIG. 13 is a view of another exemplary method step of use for the guidance system of FIG. 2.

Referring to FIG. 13, a fifth method step 510 includes placing the stop device 102 on the substrate with the foot structure 108 proximate symbolic tire 166 of rod 164. The fifth method step further includes unwrapping flexible strap 122 to extend along the general direction of the anticipated direction of the rearward direction of vehicle 10 as it moves in reverse toward trailer 30.

Figure 14:
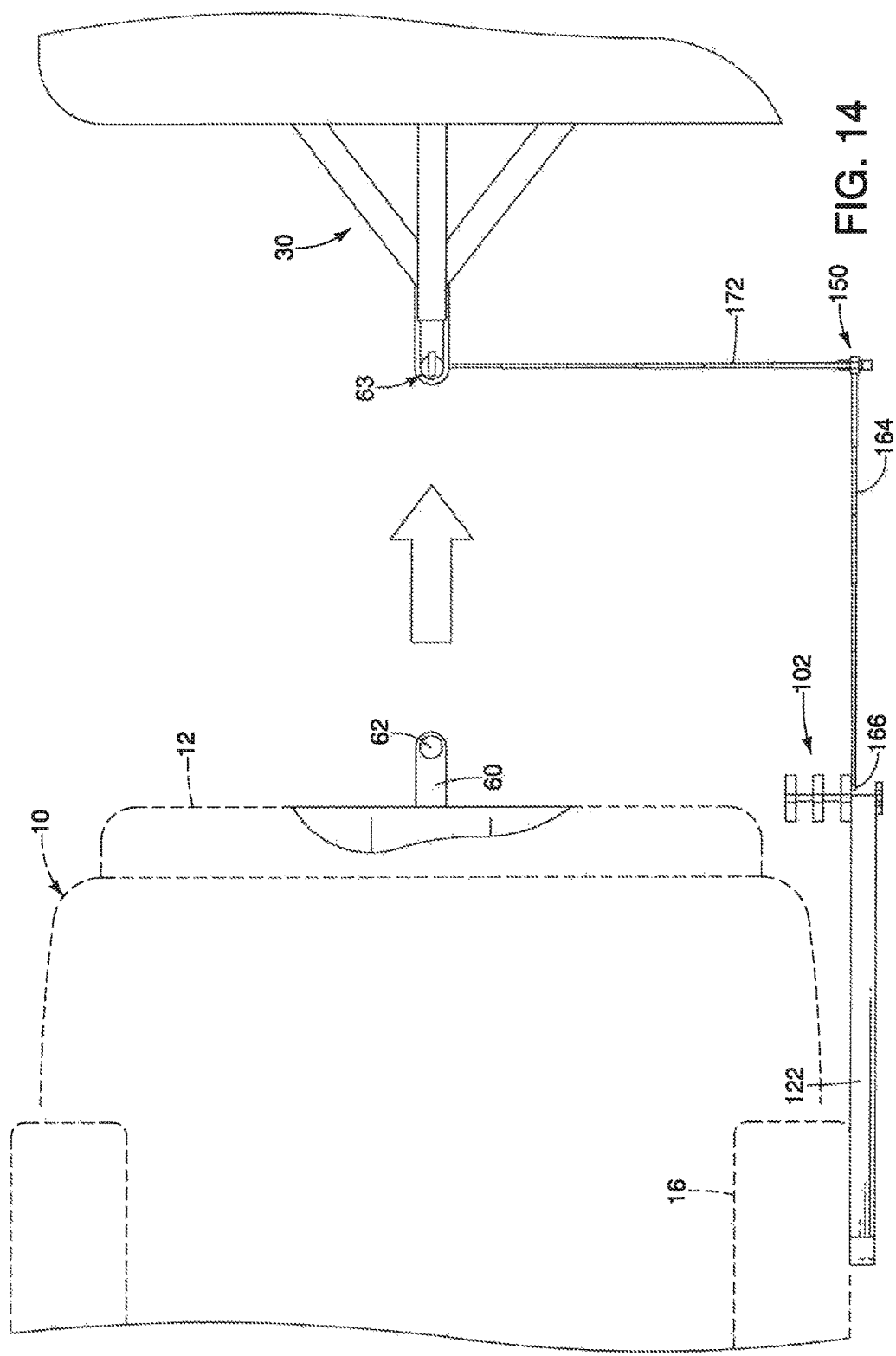
FIG. 14 is a view of another exemplary method step of use for the guidance system of FIG. 2.

Referring to FIG. 14, a sixth method step 512 includes moving the vehicle 10 in reverse with the tire 16 moving generally along the flexible strap 122 as the vehicle moves toward trailer 30.

Figure 15:
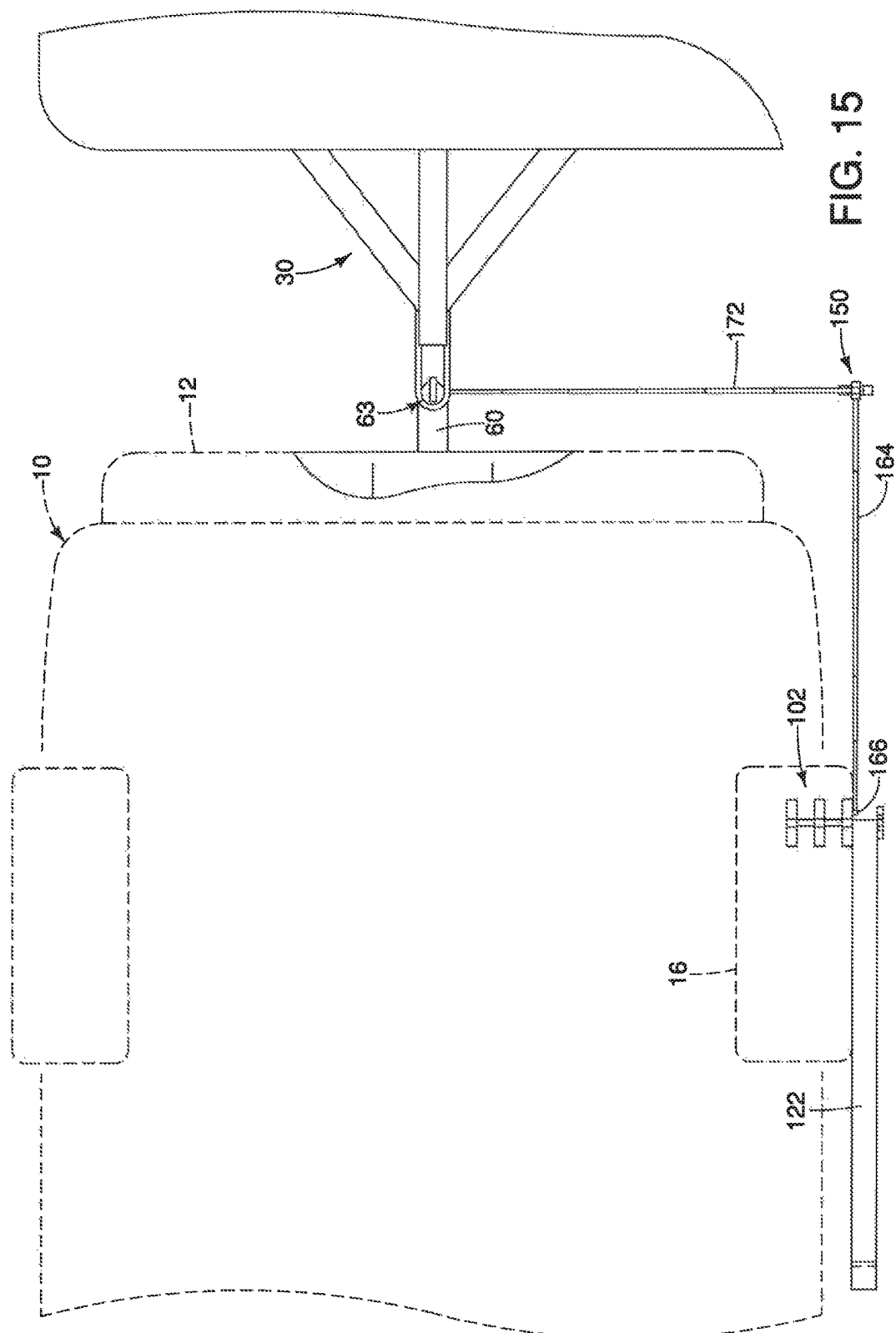
FIG. 15 is a view of another exemplary method step of use for the guidance system of FIG. 2.

Referring to FIG. 15, a seventh method step 514 includes continually moving the vehicle 10 in reverse toward the trailer 30 until the tire 16 contacts one or more of the foot structures of stop device 102 thereby halting the movement of truck 10 with the tow ball 62 (tow ball 62 cannot be seen beneath the trailer socket 63) directly beneath the trailer socket 63. The trailer socket 63 can now be locked on the tow ball 62. The exemplary guidance system 100 is stowed away by: rolling/wrapping the flexible strap 122 back onto the stop device 102; retracting the rods 164 and 172 of spatial device 150; and placing the spatial device 150 into the stop device 102.

Figure 16:
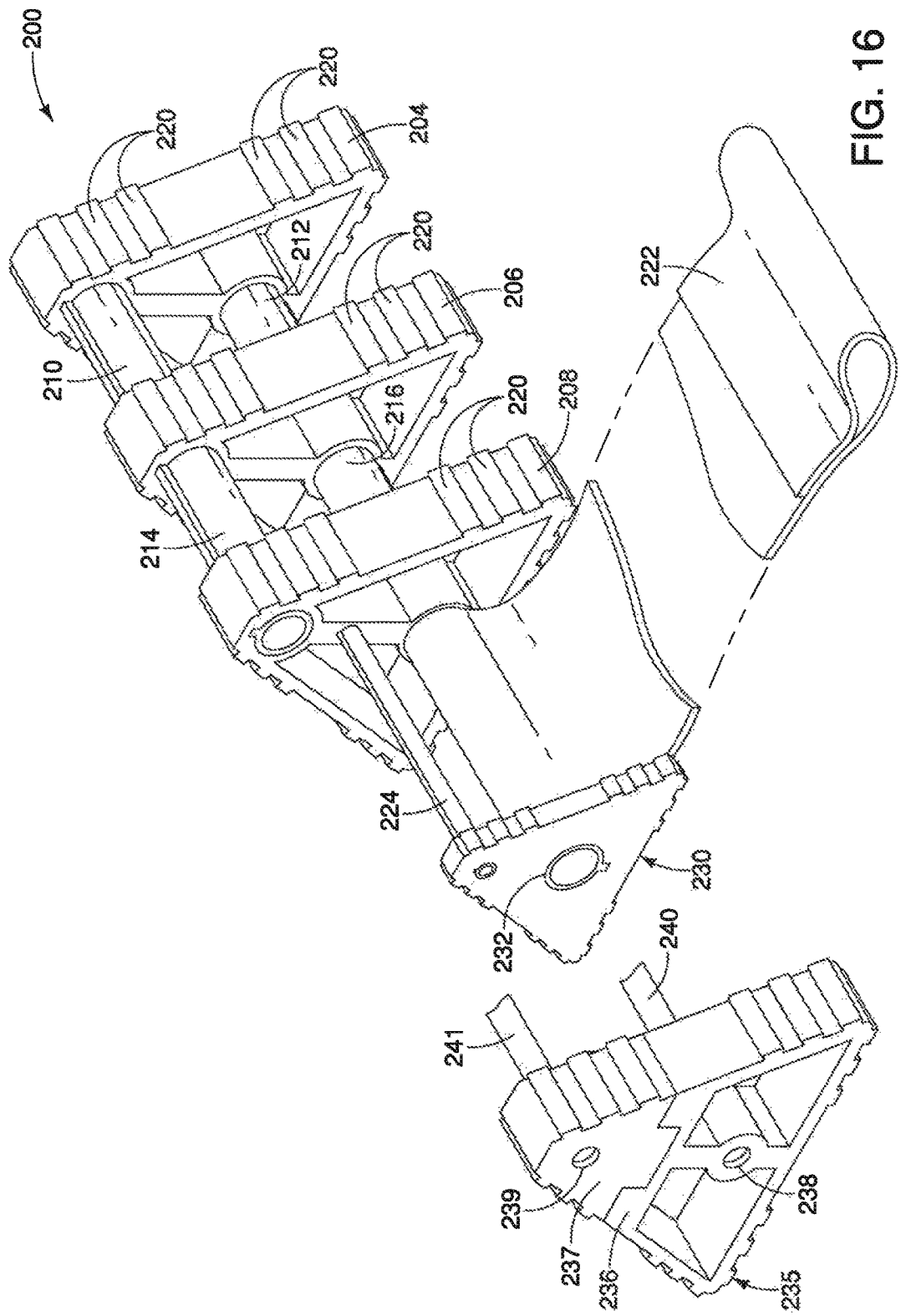
FIG. 16 is a perspective view of another exemplary guidance system according to another embodiment of the invention.

Referring to FIG. 16, an exemplary guidance system 200 according to another embodiment of the invention is illustrated. The foot structures 204, 206, 208 and 235 of guidance system 200 are not solid structures and have openings extending entirely through the respective foot structures. Moreover, upper tube structure(s) 210 and 214 are keyed structure(s) to prevent foot structures 204, 206 and 208 from rotating about upper tube structure(s) 210 and 214. Lower tube structure(s) 212, 216 and 232 are keyed structure(s) to prevent foot structures 204, 206, 208 and end plate 230 from rotating about lower tube structure(s) 212, 216 and 232. Any foot structure described throughout his document can be configured with openings. Moreover, any tube structure described throughout his document can be configured with key structures.

Figure 17A:
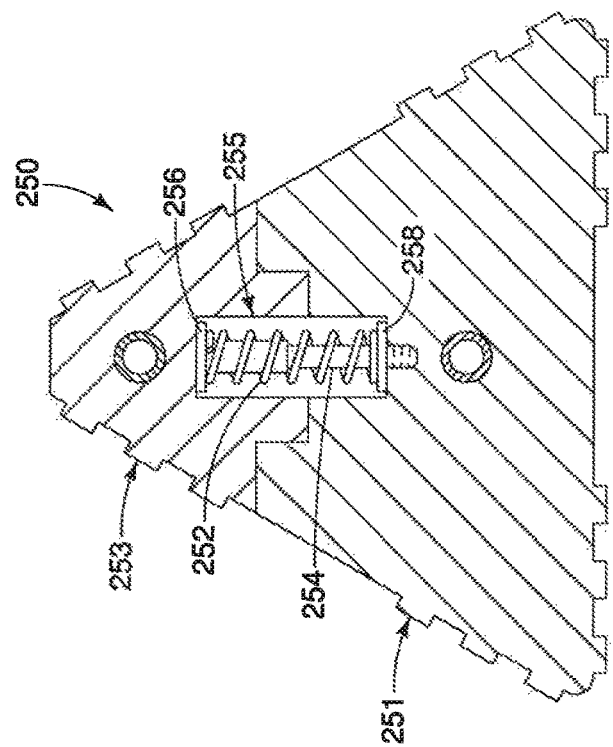
FIG. 17A is a sectional view of another exemplary spatial device for a guidance system according to another embodiment of the invention.
Figure 17B:
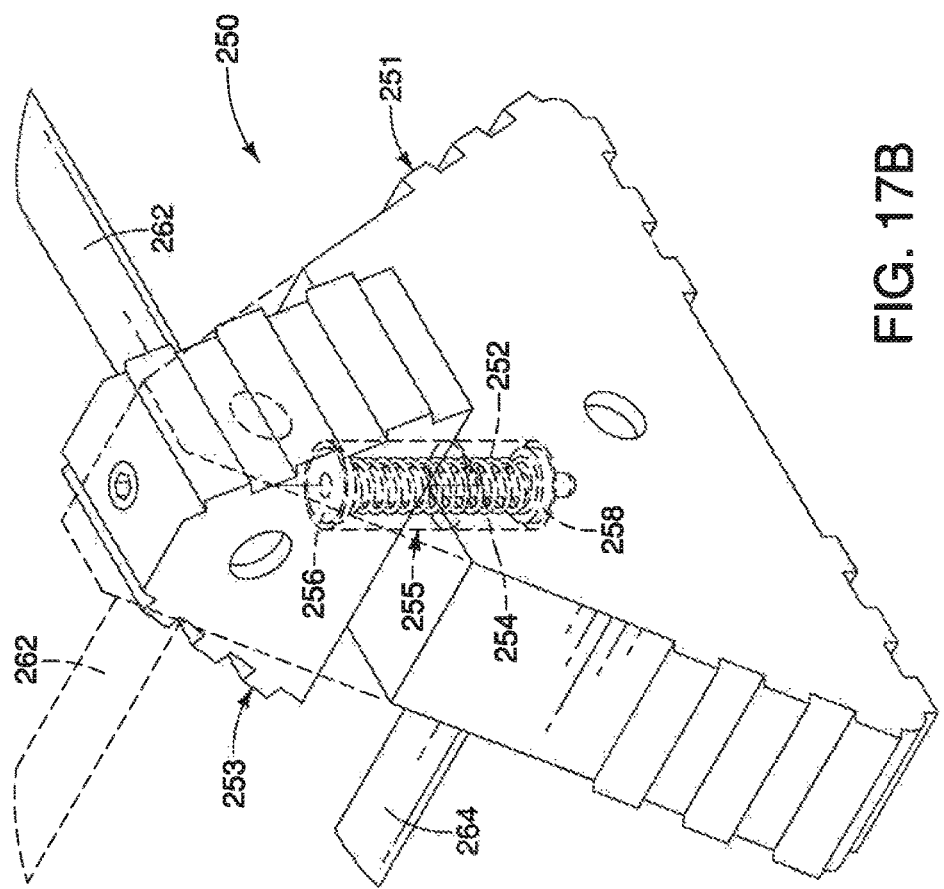
FIG. 17B is a perspective view of the spatial device of FIG. 17A.

Referring to FIGS. 17A and 17B, an exemplary spatial device 250 according to another embodiment of the invention is illustrated. Spatial device 250 can be used in any guidance system described throughout this document. Spatial device 250 includes an anchor 255 placed inside a foot structure 251/253. An anchor can be provided in any foot structure described throughout this document.

Still referring to FIGS. 17A and 17B, foot structure 251/253 is comprised by two separate and discrete portions, a lower section 251 and an upper section 253. Foot structure 251/253 includes the lower section 251 having a groove (not referenced with a number for simplicity of view) similar to lower section 152 of FIG. 3. Moreover, foot structure 251/253 includes the upper section 253 having an extension (not referenced with a number for simplicity of view) similar to upper section 154 of FIG. 3. Still further, upper section 253 includes a telescoping rod 262 and lower section 251 includes a telescoping rod 264. The telescoping rods 262 and 264 can function same as telescoping rods 164 and 172 of spatial device 150.

Still referring to FIGS. 17A and 17B, anchor 255 includes a telescoping structure 254 affixed/secured to the lower section 251 by a lower flange 258. The telescoping structure 254 is affixed/secured to the upper section 253 by an upper flange 256. A spring 252 is axially positioned over telescoping structure 254. Spring 252 has one end secured to the lower flange 258 and an opposite end secured to upper flange 256. Spring 252 forces or biases the lower and upper sections 251 and 253 together.

Still referring to FIGS. 17A and 17B and with anchor 255, spatial device 250 is configured as a single, integrated structure wherein the lower and upper sections 251 and 253 do not completely separate such as the spatial device 150 (lower and upper sections 152 and 154) of FIG. 3. In contrast, lower and upper sections 251 and 253 of spatial device 250 stay connected to each other by anchor 255. However, lower and upper sections 251 and 253 of spatial device 250 can interact the same as described for spatial device 150. That is, outer faces of lower and upper sections 251 and 253 can be coplanar similar to lower and upper sections 152 and 154 of spatial device 150 as shown in FIG. 9. Moreover, lower and upper sections 251 and 253 of spatial device 250 can be pulled apart such that the extension (not referenced) of upper section 253 is removed from the groove (not referenced) of lower section 251. Next, the two sections 251 and 253 can be rotated 90 degrees relative to each other and then the extension can be allowed to again to be positioned in the groove similar to the interaction described for spatial device 150 in FIG. 4. The biasing action of the anchor 255 will bias the extension to remain in the groove in the 90-degree orientation. In this orientation, rods 262 and 264 extend at 90 degrees relative to each other.

It should be understood that spatial device 250 can be configured without the extension (not referenced) of upper section 253 and without the groove (not referenced) of lower section 251. Accordingly, the dividing surfaces between the lower and upper sections 251 and 253 could each be planar. It should be further understood that spatial device 250 could have magnets similar to magnets 160 and 161 of spatial device 150 (as seen in FIG. 3). In this configuration, spatial device 250 will have anchor 255 in combination with the exemplary magnets. Additionally, it should be understood that spatial device 250 could have more than one anchor 255 between lower and upper sections 251 and 253, that is, a plurality of anchors. If the plurality of anchors is two and combined with magnets, the two anchors could be positioned on opposite sides of the magnets. If the plurality of anchors is three and combined with magnets, the three anchors could be fashioned in a triangular pattern around the magnets. If the plurality of anchors is four and combined with magnets, the four anchors could be fashioned in a square pattern around the magnets.

Referring to FIG. 18, another exemplary guidance system 330 is illustrated according to another embodiment of the invention and another exemplary method of use 600 is described. In this embodiment, guidance system 330 is a single, integral structure. Assuming that the guidance system 330 is in a storage condition, then a first rod 332 is stored in a retracted, closed position in a central connector 334 and a second rod 336 is stored in a retracted, closed position in the central connector 334.

Still referring to FIG. 8, guidance system 330 includes an exemplary central connector 334 (hub or foot device) can be a block of material configured to receive first and second rods 332 and 336. One or both of rods 332 and 336 can be retracted and received entirely in the central connector 334. Alternatively, one or both of rods 332 and 336 can be retracted and received only partially in the central connector 334. In another embodiment, central connector 334 can be configured and operate the same as the spatial device 150 of FIGS. 3 and 4 except that the second rod 336 will have a greater length to facilitate guiding the alignment of a vehicle moving in reverse to a pre-selected (marked) stop position. In still another embodiment, central connector 334 can be configured and operate as the spatial device 250 of FIGS. 17A and 17B with second rod 336 having a greater length as just explained. A flexible strap 338 is stored by being folded or wrapped around second rod 336.

An exemplary first method step 602 of the method of use 600 for guidance system 330 includes the first or second rod 332/336 (user's choice) being extended. When first rod 332 is selected to be extended (whether first or second), then an end of the first rod 332 is aligned directly below the tow ball of the powered vehicle (for simplicity of discussion, a powered vehicle will be a truck and is not shown). When second rod 336 is selected to be extended (whether first or second), then second rod 336 is extended to its maximum length and oriented outside the rear and front tires of one side of the truck.

This first method step 602 is a measurement step which is specific for the specific vehicle being used. Accordingly, the extension length of the first rod 332 is noted by marking, as one non-limiting example only, an intersection of two intersecting telescopic sections of the first rod 332 while it is in the extended position to the tow ball. Accordingly, when the first rod 332 is extended again and the marking of the intersection of the two previously selected telescopic sections is exposed, the first rod 332 will be at the same extension length as was previously measured and needed for this specific truck. In contrast and still in the first method step 602, the extension length of the second rod 336 is not needed. However, the second rod 336 is extended to its maximum length and the location of where the rear tire contacts the ground is marked on the second rod 336. This first method step 602 does not have to be repeated and now the guidance system 330 can be put in storage again or used for guiding a tow ball of the truck to be coupled to a trailer socket 63.

Still referring to FIG. 18 and using the guidance system 330 for coupling the tow ball to the trailer socket 63, a second method step 604 includes extending the first rod 332 until the marking on the first rod 332 is visible and then to position the end of the first rod 332 beneath the trailer socket 63. The second method step 604 further includes extending the second rod 336 to its maximum length and directed generally along an anticipated direction of the rearward direction of the truck as it moves in reverse toward trailer 30.

Still referring to FIG. 18, a third method step 606 includes unwrapping flexible strap 338 from the second rod 336 and sliding the strap 338 along the second rod 336 to the marking on the second rod 336.

Still referring to FIG. 18, a fourth method step 608 includes moving the truck in reverse with the tires moving generally along the second rod 336 as the truck moves toward trailer 30.

Still referring to FIG. 18, a fifth method step 610 includes continually moving the truck in reverse toward the trailer 30 until the rear tire reaches a position adjacent the flexible strap 338 and stopping the truck at this location. At this location, the tow ball of the truck will be aligned directly beneath the trailer socket 63 of the trailer 30 to subsequently be coupled.

Referring to FIGS. 19A and 19B, another exemplary guidance system 360 is illustrated according to another embodiment of the invention and another exemplary method of use 700 is described. In this embodiment, guidance system 360 is a single, integral structure. However, the guidance system 360 does have a spatial device 364 which can configured the same as the spatial device 150 of guidance system 100. Moreover, the guidance system 360 does have a stop device 368 which can be configured the same as the stop device 102 of guidance system 100.

Still referring to FIGS. 19A and 19B, the guidance system 360 includes a second rod 366 of spatial device 364 secured to a foot structure 370 of the stop device 368. In one embodiment, the end of rod 366 is affixed to be stationary into the foot structure 370 of stop 368. Alternatively, in another embodiment, the rod 366 sliding engages the foot structure 370 of stop 368, and therefore, the foot structure 370 and stop 368 can move along the length of the rod 366. Moreover, the foot structure 365 of spatial device 364 can be configured and operate the same as any foot structure discussed throughout this document. For example, the foot structure 365 of spatial device 364 can be configured and operate the same as the foot structure 152/154 of spatial device 150 of FIGS. 3 and 4. Alternatively, the foot structure 365 of spatial device 364 can be configured and operate the same as the foot structure 251/253 of spatial device 250 of FIGS. 17A and 17B. Still further, the foot structure 365 of spatial device 364 can be configured and operate the same as the central connector 334 of guidance system 330 of FIG. 18.

Still referring to FIGS. 19A and 19B and assuming that the guidance system 360 is in a storage condition, then the first rod 362 of spatial device 364 is stored in a retracted, closed position in foot structure 365 and a second rod 366 is stored in a retracted, closed position in the foot structure 365. Accordingly, in this storage configuration, spatial device 364 and foot structure 365 are adjacent and/or abutting the foot structures 370 of stop device 368.

An exemplary first method step 702 of method of use 700 is the measurement step discussed throughout this document and needing only to be performed once for any specific vehicle. If foot structure 365 of spatial device 364 has the rotating capability of the spatial device 150 of FIGS. 3 and 4, then such will be performed now to angle rod 362 at approximately ninety degrees to rod 366. Each of the first and second rods 362/366 are extended. First rod 362 is selected to be extended with an end aligned directly below the tow ball of the powered vehicle (for simplicity of discussion, a powered vehicle will be a truck and is not shown). The extension length of the first rod 362 is noted by a marking for later use.

Regarding the extension of second rod 366, since two difference cooperation configurations with stop device 368 were presented above, two methods of extension for rod 366 needs to be discussed. If the embodiment is the configuration of the end of rod 366 being affixed to be stationary in the foot structure 370 of stop 368, then second rod 366 is extended until the foot devices of stop device 368 rests beneath the rear tire of the truck. The extension length of the second rod 366 is noted by a marking for later use. Alternatively, if the embodiment is the configuration of the rod 366 with the foot structure 370 of stop 368 slidingly engaging rod 366, then second rod 366 is extended along the rear tire and side of the truck and the location of the rear tire adjacent the rod 366 is marked on rod 366. This mark on rod 366 is where ultimately the foot structure 370 of stop 368 will be positioned to stop the truck with the tow ball beneath the socket 63.

As stated, this first method step 702 of marking does not have to be repeated and now the guidance system 360 can be put in storage again or used for guiding the tow ball to be coupled to a trailer socket 63. Still referring to FIG. 19 and using the guidance system 360 for coupling the tow ball to the trailer socket 63, a second method step 704 includes extending the first rod 362 until the marking on the first rod 362 is visible and then positioning the end of the first rod 362 beneath the trailer socket 63. The second method step 704 further includes extending the second rod 366 this extension depends on the which of the two embodiments are used. If the embodiment is the configuration of the end of rod 366 being affixed to be stationary in the foot structure 370 of stop 368, then second rod 366 is extended until the marking is visible. This extension length of rod 366 will position the stop device 368 at the location for stopping the truck with the tow ball and socket 63 being aligned. Alternatively, if the embodiment is the configuration of the rod 366 with the foot structure 370 of stop device 368 slidingly engaging rod 366, then second rod 366 is extended along the rear tire and side of the truck until the mark is visible and the foot structure 370 of stop 368 slide along rod 366 to rest upon this mark. This extension length of rod 366 will position the stop device 368 at the location for stopping the truck with the tow ball and socket 63 being aligned. Accordingly, a third method step 706 may include sliding the foot structure 370 of stop device 368 along the second rod 366 until the foot structure 370 rests at the marking on the second rod 366. This method step would not be needed in the first embodiment of the cooperation of rod 366 with stop device 368.

Still referring to FIG. 19, a fourth (or third if other embodiment discussed above) method step 708 includes unwrapping a flexible strap 372 from a rod (not shown and extending between foot structures) and extending the flexible strap 372 to its full length.

Still referring to FIG. 19, a fifth method step 710 includes moving the truck in reverse with the tires moving generally along the flexible strap 372 as the truck moves toward the trailer 30.

Still referring to FIG. 19, a sixth method step 712 includes continually moving the truck in reverse toward the trailer 30 until the rear tire abuts the foot structures 370 of the stop device 368. At this location, the tow ball of the truck will be aligned directly beneath the trailer socket 63 of the trailer 30 to subsequently be coupled.

Referring to FIGS. 20A and 20B, another exemplary guidance system 400 is illustrated according to another embodiment of the invention and another exemplary method of use 800 is described. In this embodiment, guidance system 400 is a single, integral structure. Guidance system 400 has a central connector or hub 404 that includes a housing 405 represented generally as a square (for simplicity). Housing 405 includes a first axle/roller 412 extending from one side and a second axle/roller 410 extending from another side. The first axle/roller 412 receives a first strap 402 and the second axle/roller 410 receives a second strap 406. Respective straps 402/406 can be selectively rolled upon respective axle/rollers 412/410, and alternatively, respective straps 402/406 can be selectively rolled off respective axle/rollers 412/410. The operation of first and second axle/rollers 412/410 can be an electrical operation or a mechanical operation.

An exemplary electrical operation of guidance system 400 could include a pair of electric motors (not shown) located in housing 405 and each in driving cooperation with one of the first and second axle/rollers 412/410. Current to the electric motors can be provided by batteries (not shown) in housing 405 or an electric power plug (not shown) extending from housing 405 could be plugged into a socket of an alternating current (AC) power source. The electric motor can be selectively activated to rotate in one of two opposite directions thereby selectively rolling or unrolling first and second straps 402/406 relative to axle/rollers 412/410. During use of the guidance system 400, the first and second straps 402/406 can be automatically unrolled with the manipulation of a button (not shown) to any desired length. When the use of the guidance system 400 is finished, the first and second straps 402/406 can be automatically rolled upon respective axle/rollers 412/410 again with the manipulation of the button.

Alternatively, an exemplary mechanical operation of guidance system 400 could include a pair of ratchet mechanisms (not shown) located in housing 405 and each in driving cooperation with one of the first and second axle/rollers 412/410. An exemplary ratchet mechanism could include a gear and pawl combination. During use of the guidance system 400, the first and second straps 402/406 can be manually pulled to unroll from respective axle/rollers 412/410 to any selective length. Once the selective length is reached, then the pulling action can cease to allow the pawl to engage a tooth of the gear to maintain the desired/selective length of the straps 402/406. When the use of the guidance system 400 is finished, the pawl can be moved away from the teeth of the gear and a spring (not shown) can bias the gear to rotate in an opposite direction to roll the first and second straps 402/406 back upon the respective axle/rollers 412/410. It should be understood that the gear of the ratchet mechanism can be driven in one or both directions by an electric motor to selectively roll and unroll the straps 402/406.

Still referring to FIGS. 20A and 20B, and assuming that the guidance system 400 is in a storage condition, then the first strap 402 is stored in a rolled up (retracted), closed position on axle/roller 412 of hub 404 and the second strap 406 is stored in a rolled up (retracted), closed position on axle/roller 410 of hub 404. It should also be assumed that a measurement step has already been performed similar to the third method step 506 of method of use 500 described previously (see FIG. 11). Accordingly, the desired length of the first strap 402 with the end below the socket 63 is noted by a marking already having been placed on strap 402. An exemplary marking on strap 402 can show up exposed in axle/roller 412 when the desired length of strap 402 is reached for the specific truck being used. It should be understood that while second strap 406 will also have a mark provided during the measurement step similar to the third method step 506 of method of use 500, it is used differently, and therefore, second strap 406 is extended to its maximum length as explained subsequently.

Still referring to FIGS. 20A and 20B, a first method step 804 (not counting the measurement step that is similar to the third method step 506 of method of use 500 mentioned above) includes extending the first strap 402 by unrolling from axle/roller 412 until the marking on the first strap 402 is visible and then to position the end of the first strap 402 beneath the trailer socket 63. The first method step 804 further includes extending the second strap 406 to its maximum length by unrolling from axle/roller 410.

Still referring to FIGS. 20A and 20B, a second method step 806 includes unwrapping third strap 408 from the second strap 406 and sliding the third strap 408 along the second strap 406 to the marking on the second strap 406.

Still referring to FIGS. 20A and 20B, a third method step 808 includes moving the truck in reverse with the tires moving generally along the second strap 406 as the truck moves toward trailer 30.

Still referring to FIGS. 20A and 20B, a fourth method step 810 includes continually moving the truck in reverse toward the trailer 30 until the rear tire reaches a position adjacent the third strap 408 and stopping the truck at this location. At this location, the tow ball of the truck will be aligned directly beneath the trailer socket 63 of the trailer 30 to subsequently be coupled.

Referring to FIGS. 21A and 21B, an exemplary guidance system 270 according to another embodiment of the invention is illustrated. A difference of guidance system 270 relative to guidance system 100 of FIG. 2 is that a spatial device 272 is pivotably secured to a stop device (collectively including foot structures 280, 282 and 284) by a pivot pin 298 (or universal joint (U-joint)). The stop device has three spaced foot structures 280, 282 and 284 and the spatial device 272 has one foot structure (or hub) 274/276. The spatial device 272 includes an upper telescoping rod 290 and a lower telescoping rod 294 each extending through each foot structures 280, 282 and 284 of the stop device. Spatial device 272 is comprised by two separate and discrete portions, a lower section 274 and an upper section 276 that can be separated from each other the same as the spatial device 150 shown in FIG. 3 and can cooperate and mate together the same as the spatial device 150 shown in FIG. 4. Pivot pin 298 extends through an end of the lower telescoping rod 294 of lower section 274 (of spatial device 272) into foot structure 284 of the stop device.

Still referring to FIGS. 21A and 21B, each foot structure 280, 282 and 284 of the stop device has an upper pathway 300 and a lower pathway 296. When the guidance system 270 is not in use (in storage) and therefore in the closed state or condition, the upper telescoping rod 290 of spatial device 272 rests in respective upper pathways 300 and the lower telescoping rod 294 rests in respective lower pathways 296. When the guidance system 270 is in use, the upper section 276 of spatial device 272 is separated from the lower section 274 and the upper telescoping rod 290 is removed from the foot structures 280, 282 and 284 of the stop device through upper pathway 300. The lower section 274 of spatial device 272 is pivoted about pivot pin 298 via the end of the lower telescoping rod 294. The lower telescoping rod 294 moves though the lower pathways 296 until the spatial device 272 pivots approximately ninety degrees from the closed state to rest with the lower section 274 of the spatial device 272 facing the foot structure 284 of the stop device.

In this configuration, guidance system 270 can be used in the same method steps as described for guidance system 100 in FIGS. 11-15, and therefore, the description is not repeated. However, it should be noted that since the lower section 274 of the spatial device 272 is pivoted in the foot structure 284 with lower rod 294 laterally spaced from a length of material 278 (flexible strap), then when the vehicle moves rearward toward the trailer, the inside of rear tire should be moving along upon the extended length of material 278. It should be further understood that guidance system 270 includes a rod 292 to receive the length of material 278 that is secured to foot structure 280 of the stop device between the telescoping rods 290/294. Rod 292 is not secured to the spatial device 272 to allow for the pivoting of spatial device 272. When the spatial device 272 is pivoted, telescoping rods 290/294 move past the length of material 278.

Still referring to FIGS. 21A, the lower section 274 of spatial device 272 is shown in fathom to illustrate positioning during use. Similar to the lower section 152 of spatial device 150 (of guidance system 100), the lower section 274 has a groove 286 to receive the upper section 276 and a magnet 288 is shown in groove 286.

Figure 22:
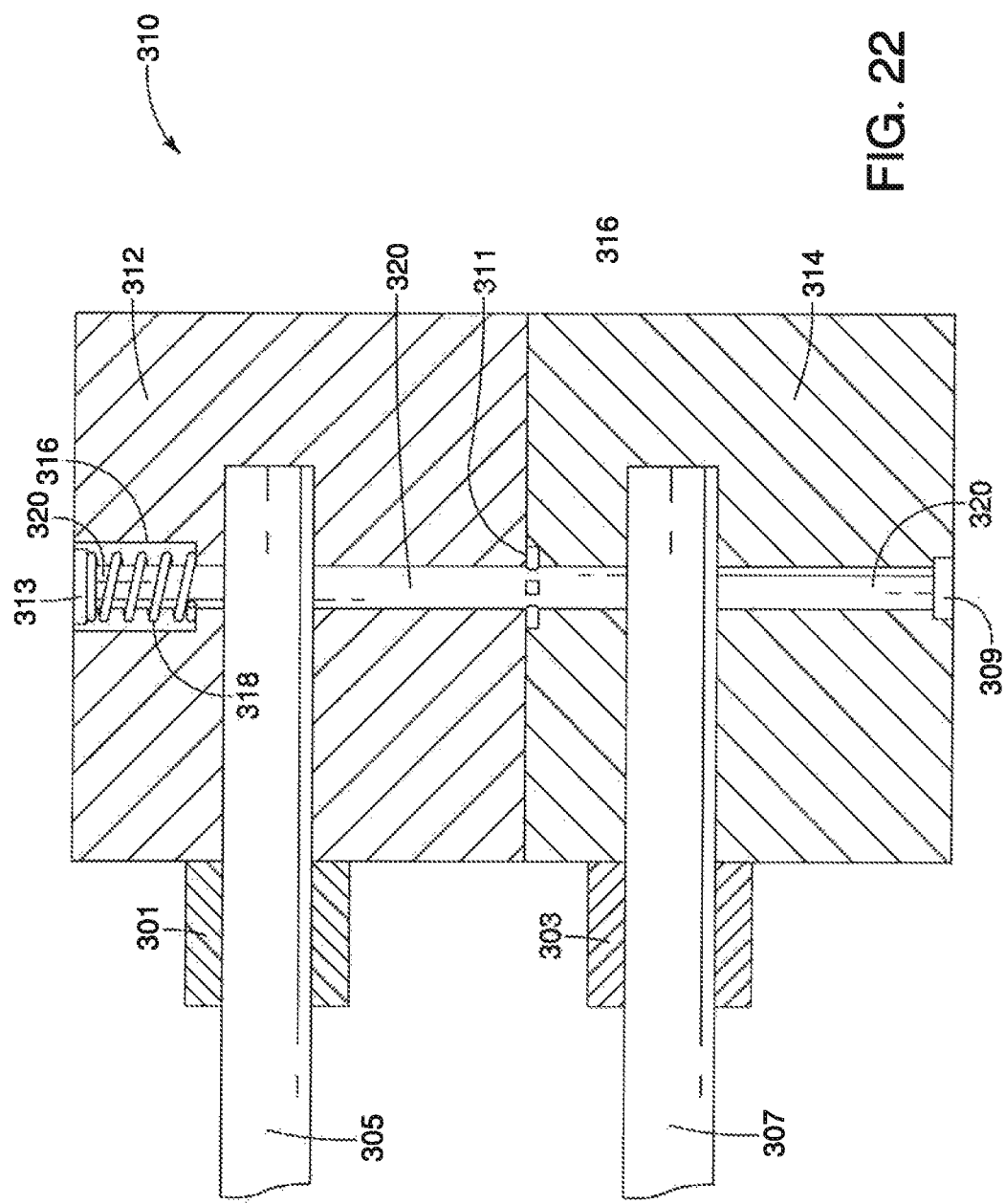
FIG. 22 is a sectional view of another exemplary spatial device for a guidance system according to another embodiment of the invention.

Referring to FIG. 22, an exemplary spatial device 310 according to another embodiment of the invention is illustrated. Spatial device 310 can be used in any guidance system described throughout this document. Spatial device 310 includes an anchor 320 placed inside a foot structure 312/314. Foot structure 312/314 with anchor 320 can be used in any guidance system described throughout this document.

Still referring to FIG. 22, foot structure 312/314 is comprised by two separate and discrete portions, a lower section 314 and an upper section 312. Upper section 312 includes a telescoping rod 305 and lower section 314 includes a telescoping rod 307. A bushing or bearing 301 supports telescoping rod 305 adjacent upper section 312. A bushing or bearing 303 supports telescoping rod 307 adjacent lower section 314. The telescoping rods 305/307 can function same as telescoping rods 164 and 172 of spatial device 150.

Still referring to FIG. 22, anchor 320 is affixed/secured to the lower section 314 by a lower flange 309. An upper flange 313 is secured to the top of the anchor 320 and both are not affixed or secured to the upper section 312. Accordingly, upper section 312 can move upward with flange 313 disappearing into an opening 316 in the upper section 312. A spring 318 is axially positioned over an upper portion of anchor 320 in the opening 316 of upper section 312. Spring 318 has one end biased against a bottom surface of opening 316 in upper section 312 and an opposite end of spring 318 is biased against upper flange 313. Spring 318 forces or biases the lower and upper sections 314 and 312 together. A bushing or bearing 311 facilitates the transition of anchor 320 from upper section 312 to lower section 314.

Still referring to FIG. 22 and with anchor 320, spatial device 310 is configured as a single, integrated structure wherein the lower and upper sections 314 and 312 do not completely separate such as the spatial device 150 (lower and upper sections 152 and 154) of FIG. 3. In contrast, lower and upper sections 314 and 312 of spatial device 310 stay connected to each other by anchor 320. However, lower and upper sections 314 and 312 of spatial device 310 can interact the same as described for spatial device 150. That is, lower and upper sections 314 and 312 of spatial device 310 can be pulled apart and rotated 90 degrees relative to each other similar to the interaction described for spatial device 150 in FIG. 4 (except there is no extension or groove for interaction). The biasing action of the anchor 320 and spring 318 will keep the lower and upper sections 314 and 312 together in the 90-degree orientation. In this orientation, rods 305 and 307 extend at 90 degrees relative to each other, but not shown in this view.

It should be further understood that spatial device 310 could have magnets similar to magnets 160 and 161 of spatial device 150 (as seen in FIG. 3). In this configuration, spatial device 310 will have anchor 320 in combination with the exemplary magnets. Additionally, it should be understood that spatial device 310 could have more than one anchor 320 between lower and upper sections 314 and 312, that is, a plurality of anchors. If the plurality of anchors is two and combined with magnets, the two anchors could be positioned on opposite sides of the magnets. If the plurality of anchors is three and combined with magnets, the three anchors could be fashioned in a triangular pattern around the magnets. If the plurality of anchors is four and combined with magnets, the four anchors could be fashioned in a square pattern around the magnets.

It should be understood that the foot structures and stop devices, in one exemplary embodiment, are wheel chocks.

In compliance with the statute, the various embodiments have been described in language more or less specific as to structural and methodical features. It is to be understood, however, that the various embodiments are not limited to the specific features shown and described, since the means herein disclosed comprise disclosures of putting the various embodiments into effect. The various embodiments are, therefore, claimed in any of its forms or modifications within the proper scope of the appended claims appropriately interpreted in accordance with the doctrine of equivalents.

What is claimed is:

1. A guidance system for coupling vehicles, the system comprising:
    a hub;
    a first length of material secured to the hub and configured for spacing the hub from a coupling device of a vehicle; and
    a second length of material secured to the hub and configured for spacing the hub from a wheel of the vehicle.

2. The guidance system of claim 1 further comprising a third length of material in sliding engagement with one of the first and second lengths of material.

3. The guidance system of claim 1 wherein the first length of material is oriented in a direction extending substantially ninety degrees relative to a direction of extension of the second length of material.

4. The guidance system of claim 1 wherein, collectively, the hub, the first length of material and the second length of material comprise a spatial device and a stop device.

5. The guidance system of claim 1 further comprising a stop device configured to impede movement of a vehicle.

6. The guidance system of claim 1 further comprising a stop device configured to impede movement of a vehicle, and wherein, collectively, the hub, the first length of material and the second length of material comprise a spatial device, the stop device and the spatial device are two separate and discrete structures.

7. The guidance system of claim 1 further comprising a stop device configured to impede movement of a vehicle, and wherein, collectively, the hub, the first length of material and the second length of material comprise a spatial device, the stop device and the spatial device are configured as a single, integral structure.

8. The guidance system of claim 1 further comprising a stop device configured to impede movement of a vehicle, and wherein, collectively, the hub, the first length of material and the second length of material comprise a spatial device, the stop device is selectively removable from the spatial device.

9. The guidance system of claim 1 wherein at least one of the first and the second lengths of material comprise at least one of the following structure: a strip of cloth; a strip of metal; and a telescoping rod.

10. The guidance system of claim 1 wherein the hub comprises an upper section and a lower section, the upper section having the first length of material and the lower section having the second length of material.

11. The guidance system of claim 10 wherein the upper section of the hub is capable of being selectively removable from, and selectively attached to, the lower section.

12. The guidance system of claim 11 wherein the capability of the upper section of the hub being selectively removed and selectively attached to the lower section allows for at least one of the following configurations: the first length of material oriented at ninety degrees relative to the second length of material; and with the first length of material oriented to be aligned along the same line as the second length.

13. A guidance system for coupling vehicles, the system comprising:
    a stop device configured to impede movement of vehicle; and
    a spatial device comprising a first telescoping rod configured for rotation relative to a second comprising a first telescoping rod configured for rotation positioning the first telescoping rod to extend in a direction oriented at substantially ninety degrees relative a direction of the second telescoping rod.

14. The guidance system of claim 13 wherein the stop device further comprises a length of material.

15. The guidance system of claim 13 where the stop device defines a first opening spaced from a second opening, the first opening configured to receive the first telescoping rod and the second opening configured to receive the second telescoping rod.

16. A method for coupling vehicles, the method comprising:
    providing a telescoping rod comprising a first end opposite a second end;
    aligning the first end of the telescoping rod beneath a coupling device of a first vehicle;
    spacing the opposite second end of the telescoping rod a first predetermined distance from the first end;
    using the location of the second end of the telescoping rod as a pivot point and pivoting the telescoping rod ninety degrees;

spacing the first end of the telescoping rod a second predetermined distance from the second end located at the pivot point; and using the location of the first end of the telescoping rod at the second predetermined distance to position a wheel of a second vehicle to coupled to the first vehicle.

17. The method of claim 16 wherein the first and second predetermined distances are calculated by:

providing a first telescoping rod and a second telescoping rod with each having end secured together;

orienting the first telescoping rod at ninety degrees relative to the second telescoping rod;

positioning an end of the second telescoping rod adjacent the wheel of the second vehicle to establish the second predetermined distance; and positioning an end of the first telescoping rod beneath the coupling device of the first vehicle.

* * * * *